United States Patent
Pajic

(10) Patent No.: US 10,150,395 B2
(45) Date of Patent: *Dec. 11, 2018

(54) ELECTRONIC DEVICE SUPPORT FOR VEHICLES

(71) Applicant: SmartTray International, LLC, Scottsdale, AZ (US)

(72) Inventor: Nick Pajic, Phoenix, AZ (US)

(73) Assignee: SmartTray International, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,981

(22) Filed: Jul. 10, 2017

(65) Prior Publication Data

US 2017/0305321 A1 Oct. 26, 2017

Related U.S. Application Data

(63) Continuation of application No. 14/753,264, filed on Jun. 29, 2015, now Pat. No. 9,701,234, which is a
(Continued)

(51) Int. Cl.
*B60N 3/00* (2006.01)
*B64D 11/06* (2006.01)
(Continued)

(52) U.S. Cl.
CPC ............... *B60N 3/004* (2013.01); *A47B 21/04* (2013.01); *A47B 21/06* (2013.01); *A47B 23/00* (2013.01);
(Continued)

(58) Field of Classification Search
CPC .......... B60N 3/00; B60N 3/002; B60N 3/001; B60N 3/004; B60R 2011/0015;
(Continued)

(56) References Cited

U.S. PATENT DOCUMENTS 2,132,279 A 10/1938 Wicknick et al.
2,619,395 A * 11/1952 Kent ...................... B60N 3/004
108/38

(Continued)

FOREIGN PATENT DOCUMENTS

DE 9409709 9/1994
FR 2941198 7/2010
(Continued)

OTHER PUBLICATIONS

Mar. 22, 2013 International Search Report for PCT/US2012/059329, 2 pages.
(Continued)

*Primary Examiner* — Jose V Chen
(74) *Attorney, Agent, or Firm* — Weide & Miller, Ltd.

(57) ABSTRACT

A support for portable electronic devices increases passenger convenience and comfort. The support may comprise a collapsible cavity that accepts one or more portable electronic devices. The cavity is collapsible to help secure a portable electronic device therein or for storage purposes. The portable electronic devices may be held at various viewing angles relative to the passenger. A passenger may be permitted to adjust the angle at which his or her portable electronic device is positioned.

4 Claims, 17 Drawing Sheets

Related U.S. Application Data continuation of application No. 14/541,044, filed on Nov. 13, 2014, now Pat. No. 9,067,682, which is a continuation-in-part of application No. 14/203,547, filed on Mar. 10, 2014, now Pat. No. 9,168,876, which is a continuation-in-part of application No. 13/644,382, filed on Oct. 4, 2012, now Pat. No. 8,667,904.

(60) Provisional application No. 61/641,098, filed on May 1, 2012, provisional application No. 61/546,969, filed on Oct. 13, 2011.

(51) Int. Cl.
| | |
|---|---|
| H02J 50/10 | (2016.01) |
| A47B 23/00 | (2006.01) |
| B60R 11/02 | (2006.01) |
| A47B 21/04 | (2006.01) |
| A47B 21/06 | (2006.01) |
| B60R 11/00 | (2006.01) |

(52) U.S. Cl.
CPC ........ B60R 11/02 (2013.01); B64D 11/0638 (2014.12); H02J 50/10 (2016.02); A47B 2021/066 (2013.01); B60R 2011/0015 (2013.01); Y10T 29/49826 (2015.01)

(58) Field of Classification Search
CPC ..... B60R 2011/0003; B60R 2011/0042; B60R 2011/0064; B60R 2011/007; B60R 2011/0071
USPC ....... 108/44, 43, 45, 42, 152, 1, 8, 9, 50.01, 108/25, 26; 297/146, 163, 170, 173, 297/188.04
See application file for complete search history.

(56) References Cited

U.S. PATENT DOCUMENTS

| | | | |
|---|---|---|---|
| 2,963,078 A * | 12/1960 | Ferrelle | B60N 3/004 |
| | | | 108/38 |
| 3,795,422 A | 3/1974 | Robinson et al. | |
| 4,726,621 A | 2/1988 | Muller | |
| 4,792,183 A | 12/1988 | Townsend, III | |
| 4,938,153 A | 7/1990 | Maes | |
| 5,060,581 A | 10/1991 | Malinski | |
| 5,078,056 A | 1/1992 | McCauley | |
| 5,092,652 A * | 3/1992 | Macaluso | A47B 13/16 |
| | | | 108/26 |
| 5,177,665 A | 1/1993 | Frank et al. | |
| 5,370,060 A | 12/1994 | Wang | |
| 5,413,035 A | 5/1995 | Fernandez | |
| 5,511,493 A | 4/1996 | Kanehl | |
| 5,586,800 A * | 12/1996 | Triplett | A47D 1/008 |
| | | | 108/26 |
| 5,876,092 A | 3/1999 | An | |
| 5,966,285 A | 10/1999 | Sellers | |
| 5,970,884 A * | 10/1999 | Taille | B60R 5/044 |
| | | | 108/44 |
| 5,984,347 A | 11/1999 | Blanc-Rosset | |
| 6,021,720 A * | 2/2000 | Boos | B60N 3/001 |
| | | | 108/152 |
| 6,085,666 A | 7/2000 | Anderson et al. | |
| 6,394,002 B1 * | 5/2002 | Blanchard | B60R 5/044 |
| | | | 108/44 |
| 6,454,349 B1 | 9/2002 | Konya | |
| 6,489,745 B1 | 12/2002 | Koreis | |
| 6,530,330 B2 | 3/2003 | Sepe et al. | |
| 6,585,212 B2 | 7/2003 | Carnevali | |
| 6,601,523 B2 | 8/2003 | Jenson | |
| 6,679,188 B1 | 1/2004 | Spagnoli, Jr. | |
| 6,732,661 B2 | 5/2004 | Grasse et al. | |
| 6,758,518 B2 | 7/2004 | Ingram et al. | |
| 6,792,875 B2 | 9/2004 | Williamson et al. | |
| 6,796,536 B1 | 9/2004 | Sevier, IV | |
| 6,796,540 B1 * | 9/2004 | Manceor | B60R 1/0235 |
| | | | 248/126 |
| 6,827,026 B2 | 12/2004 | Williamson et al. | |
| 6,830,292 B1 | 12/2004 | Yoda | |
| D505,427 S | 5/2005 | Bain | |
| 7,004,430 B2 | 2/2006 | Weekly | |
| 7,093,545 B2 * | 8/2006 | Twyford | B60N 3/005 |
| | | | 108/44 |
| 7,104,599 B2 * | 9/2006 | Berger | B60N 3/004 |
| | | | 108/134 |
| 7,207,540 B2 | 4/2007 | Thomas | |
| D555,655 S | 11/2007 | Lu | |
| 7,314,010 B2 | 1/2008 | George et al. | |
| 7,490,559 B2 | 2/2009 | Bentschneider | |
| 7,500,716 B2 | 3/2009 | Guerin et al. | |
| 7,540,243 B2 | 6/2009 | George et al. | |
| 7,578,243 B2 | 8/2009 | Gevaert | |
| 7,611,198 B2 | 11/2009 | Schweizer | |
| 7,621,593 B2 | 11/2009 | Dickinson | |
| 7,739,963 B2 | 6/2010 | Chou et al. | |
| 7,757,612 B2 * | 7/2010 | Korber | A47B 21/00 |
| | | | 108/25 |
| D620,942 S | 8/2010 | Huang | |
| D621,406 S | 8/2010 | Hoehn et al. | |
| 7,784,412 B2 | 8/2010 | Korber et al. | |
| 7,806,376 B2 | 10/2010 | Song et al. | |
| 7,963,231 B2 | 6/2011 | Osborne et al. | |
| D641,024 S | 7/2011 | Zenri et al. | |
| 7,971,929 B2 * | 7/2011 | Kennard | G09F 7/18 |
| | | | 297/146 |
| 8,091,959 B2 | 1/2012 | Berger et al. | |
| D655,351 S | 3/2012 | Zenri et al. | |
| D661,308 S | 6/2012 | Capozzoli | |
| 8,250,993 B2 * | 8/2012 | Griepentrog | G06F 1/1632 |
| | | | 108/25 |
| D667,011 S | 9/2012 | Wu | |
| 8,276,523 B2 | 10/2012 | Miller et al. | |
| 8,287,022 B2 * | 10/2012 | Decorme | B60R 5/044 |
| | | | 296/24.43 |
| 8,327,774 B1 | 12/2012 | Rivera | |
| D682,282 S | 5/2013 | Steinfeld | |
| D683,348 S | 5/2013 | Xiang et al. | |
| 8,477,482 B2 | 7/2013 | Lin et al. | |
| D688,671 S | 8/2013 | Avganim | |
| 8,526,170 B2 | 9/2013 | Nishikawa et al. | |
| 8,526,176 B2 | 9/2013 | Clark et al. | |
| 8,540,309 B2 | 9/2013 | Berger et al. | |
| D692,437 S | 10/2013 | Sugino et al. | |
| 8,547,057 B2 | 10/2013 | Dunworth et al. | |
| 8,552,593 B2 | 10/2013 | Jung et al. | |
| 8,553,159 B2 | 10/2013 | Carmichael | |
| 8,583,187 B2 | 11/2013 | Kim et al. | |
| 8,667,904 B2 * | 3/2014 | Pajic | A47B 23/00 |
| | | | 108/25 |
| 8,826,830 B2 | 9/2014 | Pajic | |
| 8,905,470 B2 | 12/2014 | Shih et al. | |
| 8,934,063 B2 | 1/2015 | Boyer, Jr. | |
| 9,067,682 B2 * | 6/2015 | Pajic | A47B 23/00 |
| 9,167,905 B2 | 10/2015 | Pajic | |
| 9,168,876 B2 * | 10/2015 | Pajic | A47B 23/00 |
| 9,701,234 B2 * | 7/2017 | Pajic | A47B 23/00 |
| 9,796,344 B2 | 10/2017 | Pajic | |
| 2002/0117593 A1 | 8/2002 | Richter | |
| 2003/0034429 A1 * | 2/2003 | Carnevali | B60R 11/02 |
| | | | 248/346.07 |
| 2003/0054687 A1 | 3/2003 | Sanner et al. | |
| 2003/0217673 A1 | 11/2003 | Berger et al. | |
| 2003/0233659 A1 | 12/2003 | Guerin et al. | |
| 2004/0125549 A1 | 7/2004 | Iredale | |
| 2005/0178297 A1 * | 8/2005 | Pipkin | A47B 23/00 |
| | | | 108/25 |
| 2006/0075934 A1 | 4/2006 | Ram | |
| 2006/0175882 A1 | 8/2006 | Schweizer | |
| 2007/0140475 A1 | 6/2007 | Kurtock | |
| 2007/0178945 A1 | 8/2007 | Cook | |

(56) References Cited

U.S. PATENT DOCUMENTS

| | | | |
|---|---|---|---|
| 2007/0283855 A1* | 12/2007 | Pozzi | A47B 23/043 |
| | | | 108/44 |
| 2007/0284500 A1* | 12/2007 | Fan | B60R 11/02 |
| | | | 248/346.06 |
| 2008/0078071 A1 | 4/2008 | Gong | |
| 2010/0205333 A1 | 8/2010 | Francois et al. | |
| 2010/0224102 A1 | 9/2010 | Allgood | |
| 2010/0253452 A1 | 10/2010 | Andochick | |
| 2010/0289449 A1 | 11/2010 | Elo | |
| 2010/0317418 A1 | 12/2010 | Zanetti | |
| 2011/0074349 A1 | 3/2011 | Ghovanloo | |
| 2011/0095577 A1 | 4/2011 | Kennard et al. | |
| 2011/0174926 A1 | 7/2011 | Margis et al. | |
| 2012/0060724 A1 | 3/2012 | Doss | |
| 2012/0139303 A1 | 6/2012 | Westerink et al. | |
| 2012/0212012 A1 | 8/2012 | Beger et al. | |
| 2012/0280530 A1 | 11/2012 | Nemoto | |
| 2012/0299540 A1 | 11/2012 | Perry | |
| 2013/0001987 A1 | 1/2013 | Heredia | |
| 2013/0093220 A1 | 4/2013 | Pajic | |
| 2013/0176669 A1 | 7/2013 | Takahashi et al. | |
| 2013/0240470 A1 | 9/2013 | Huang | |
| 2013/0314861 A1* | 11/2013 | Burford | H05K 7/00 |
| | | | 361/679.01 |
| 2013/0327255 A1 | 12/2013 | Pajic | |
| 2014/0327278 A1 | 11/2014 | Curtis et al. | |
| 2015/0061327 A1 | 3/2015 | Millan | |

FOREIGN PATENT DOCUMENTS

| | | |
|---|---|---|
| JP | H02164635 | 6/1990 |
| RU | 2009139224 | 5/2011 |
| WO | 2000002745 | 1/2000 |

OTHER PUBLICATIONS

Jul. 3, 2013 International Search Report for PCT/US2013/038941, 1 page.

Oct. 5, 2015 International Search Report for PCT/US2015/038380, 1 page.

* cited by examiner

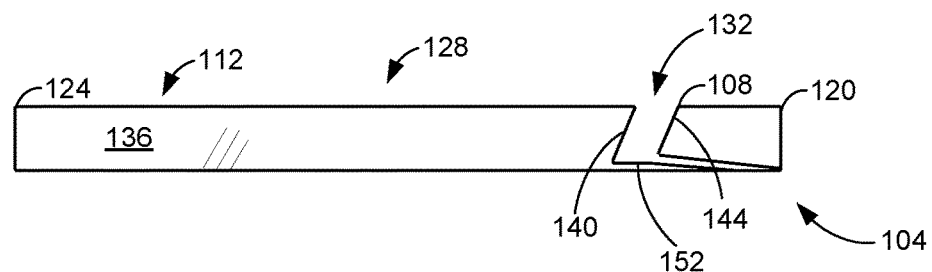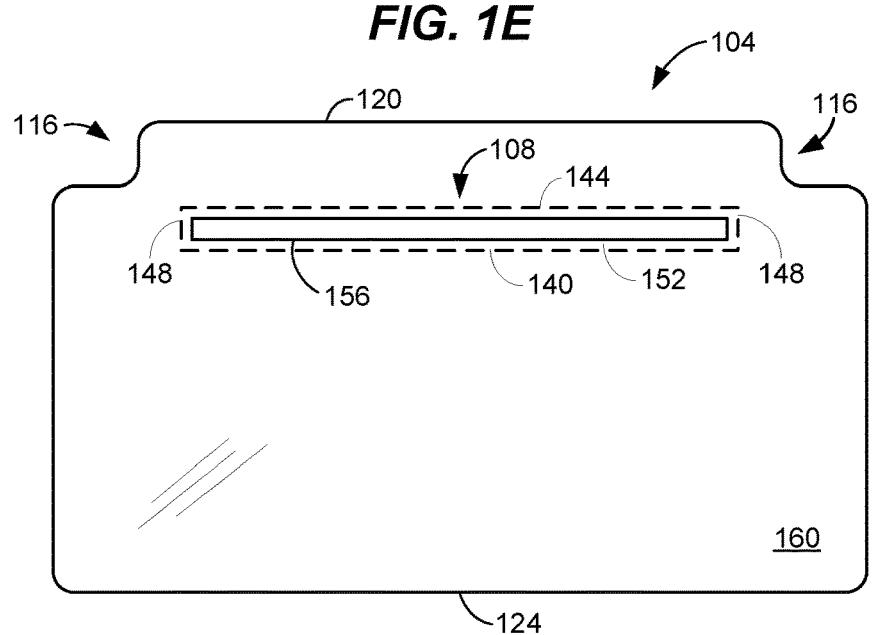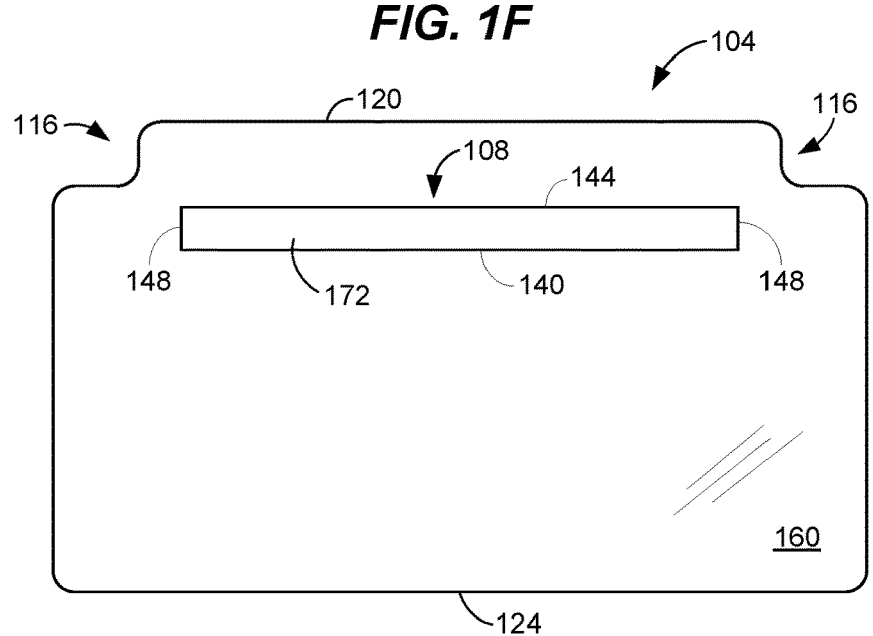

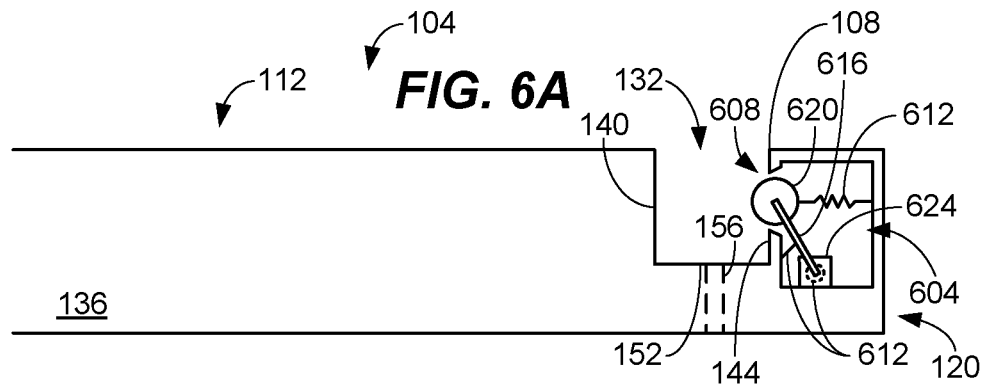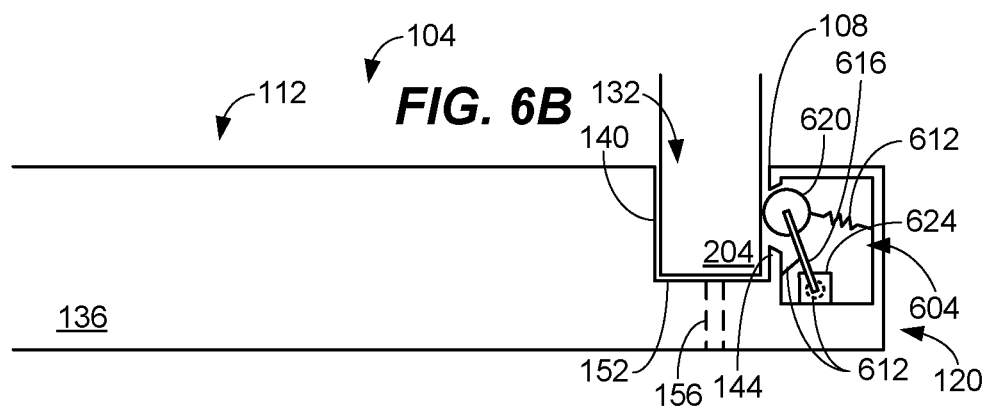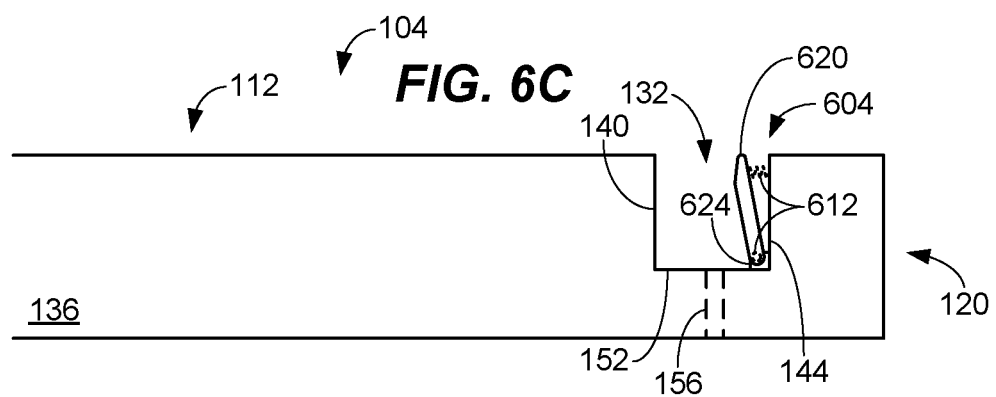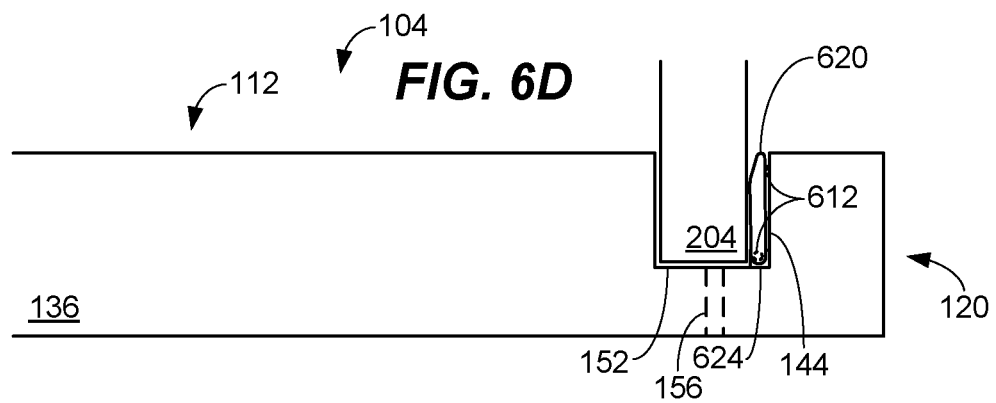

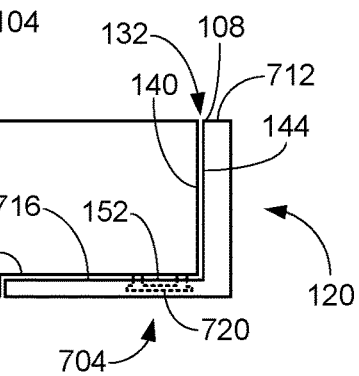
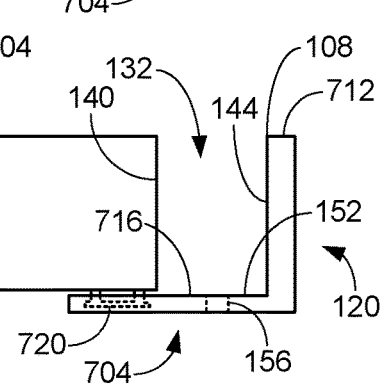
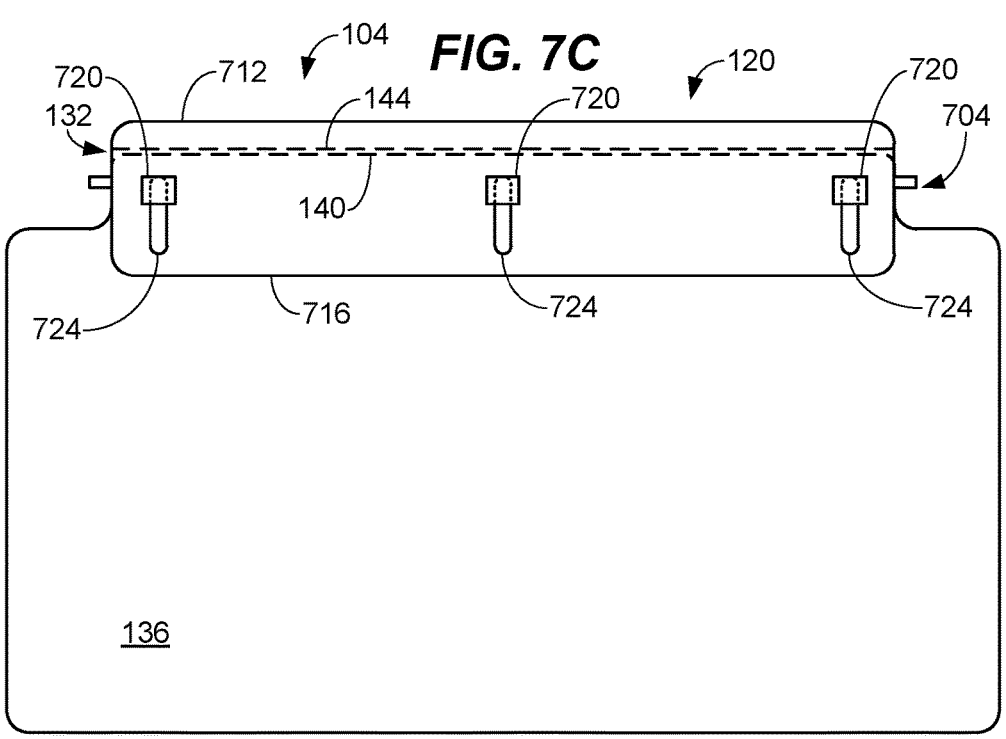

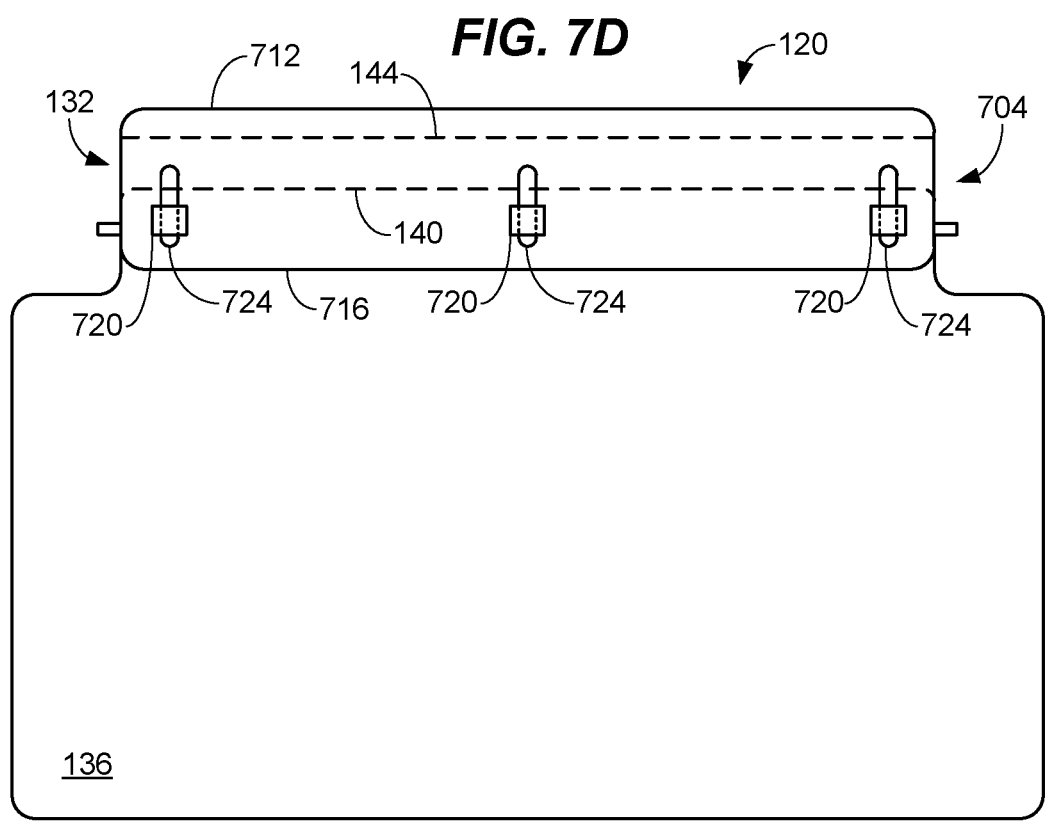

ELECTRONIC DEVICE SUPPORT FOR VEHICLES

CROSS-REFERENCE TO RELATED APPLICATIONS

This application is a continuation of U.S. patent application Ser. No. 14/753,264, filed, Jun. 29, 2015, which is a continuation of U.S. patent application Ser. No. 14/541,044, filed Nov. 13, 2014, which is a continuation-in-part of U.S. patent application Ser. No. 14/203,547, filed Mar. 10, 2014, which is a continuation-in-part of U.S. patent application Ser. No. 13/644,382, filed Oct. 4, 2012, now U.S. Pat. No. 8,667,904, which claims priority of U.S. Provisional Patent Application No. 61/641,098, filed May 1, 2012 and to U.S. Provisional Patent Application No. 61/546,969 filed Oct. 13, 2011.

BACKGROUND OF THE INVENTION

Field of the Invention

The invention relates to vehicular entertainment, and in particular to an electronic device support for vehicles

Related Art

Airplane tray tables have been largely unchanged for decades. In general, such tray tables move between a stowed upright position and a service position where a tray table is generally horizontal so that items may be supported by the tray table. In the service position, the tray table may be used to support food, drink, and other items for a passenger. Though positioned directly in reach of a passenger, traditional tray tables are limited to such functionality.

From the discussion that follows, it will become apparent that the present invention addresses the deficiencies associated with the prior art while providing numerous additional advantages and benefits not contemplated or possible with prior art constructions.

SUMMARY OF THE INVENTION

A support for portable electronic devices is disclosed herein. As will be detailed herein, the support allows passengers to easily secure portable electronic devices within a vehicle at various viewing or use positions. In this manner, entertainment or other services may be enjoyed while preserving passenger comfort. In addition, the support is highly versatile in that it is configured to accept various electronic devices and even multiple electronic devices at once, while also being easily stowed. In some embodiments, the support may be rotatable to allow passengers of different heights and having different preferences to position portable electronic devices as they desire, and to allow for cleaning and maintenance of the support.

Various embodiments and methods related to the support are disclosed herein. For instance, in one exemplary embodiment, a tray table for supporting a planar portable electronic device in a vehicle is disclosed, comprising a body having a planar shape, a fixed wall formed by a back end of the body, and a sliding wall proximate the back end of the body. The sliding wall slides from a first position where the sliding wall engages the fixed wall to a second position where the first wall is away from the fixed wall. A cavity is formed between the fixed wall and the sliding wall for receiving the planar portable electronic device when the sliding wall is in the second position. One or more mounts attach the tray table to a portion of the vehicle. A biasing device may be attached to the sliding wall to bias the sliding wall in a particular direction, such as toward the fixed wall.

In another exemplary embodiment, a support for holding a planar portable electronic device in a vehicle is disclosed, comprising a body having a front end and a back end, and a collapsible cavity for receiving the planar portable electronic device, the collapsible cavity comprising a fixed wall and a sliding wall. The fixed wall is formed by the back end of the body. The sliding wall is slideably attached proximate the back end of the body and slides from a first position where the sliding wall engages the fixed wall to a second position where the first wall is away from the fixed wall. A biasing device may be attached to the sliding wall.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 1D is a cross sectional view of an exemplary tray table with support;

FIG. 1E is a bottom view of an exemplary tray table with support;

FIG. 1F is a bottom view of an exemplary tray table with support;

FIG. 6A is a cross sectional view of an exemplary tray table with support having a biasing mechanism;

FIG. 6B is a cross sectional view of an exemplary tray table with support having a biasing mechanism;

FIG. 6C is a cross sectional view of an exemplary tray table with support having a biasing mechanism;

FIG. 6D is a cross sectional view of an exemplary tray table with support having a biasing mechanism;

FIG. 7A is a cross sectional view of an exemplary tray table with support having a collapsible slot;

FIG. 7B is a cross sectional view of an exemplary tray table with support having a collapsible slot;

FIG. 7C is a bottom view of an exemplary tray table with support having a collapsible slot; and FIG. 7D is a bottom view of an exemplary tray table with support having a collapsible slot.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the tray table herein provides a versatile support for one or more portable electronic devices. As will be described further below, the tray table may be configured to hold portable electronic devices of various shapes and sizes. This is advantageous in that it allows passengers to enjoy use of their personal electronic devices during air or other vehicular travel. For example, passengers may access and enjoy various media or other entertainment via their electronic devices during a flight, road trip, cruise, or bus or train ride. Using the tray table, passengers avoid having to hold, prop up, or otherwise secure their electronic devices in unorthodox ways, such as by leaning the devices against various surfaces at their seats. In addition, the tray table increases passenger comfort by holding portable electronic devices in an ergonomic position. In some embodiments, as will be described further below, the tray table's support may be rotatable or movable to allow adjustments to the position of a portable electronic device.

Figure 1A:
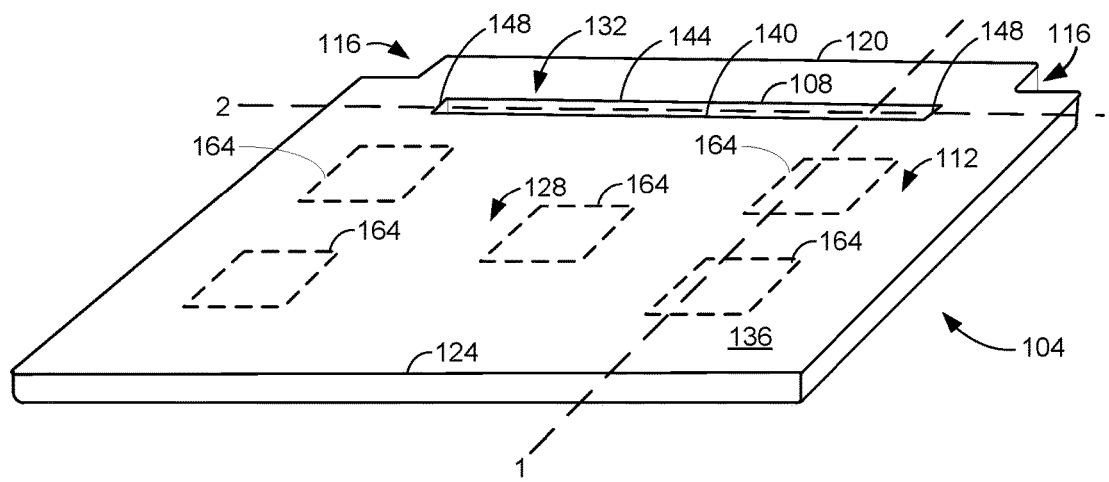
FIG. 1A is a top perspective view of an exemplary tray table with support.

FIG. 1A provides a top perspective view of an exemplary tray table 104 having a support 108 for portable electronic devices. As can be seen, the tray table 104 provides a planar top surface 112 that passengers may place their various items on. The tray table 104 may also include one or more mounting points 116 or mounts that allow it to be installed in an aircraft, such as on a back portion an aircraft passenger seat. In typical embodiments, the tray table 104 will mount to the rotatable tray table support arms of aircraft passenger seats. Mounting points may be at or near a back end 120 of the tray table 104. The mounting points 116 will typically allow the tray table 104 to rotate or otherwise move so as to allow the tray table to be moved between a stowed position (where it is secured to a seat back) and a service position (where it is substantially horizontal to support items on its top surface).

As can also be seen, the support 108 may be positioned at the back end 120 of the tray table 104. This allows the portion of the top surface 112 in front of the support 108 to be used even when the support 108 is in use. It is contemplated that the support 108 may be located at different locations as well. For instance, the support 108 may be near a front end 124 of the tray table 104, at a central portion 128, or elsewhere. Typically, the support 108 will extend laterally across the tray table 104 parallel to the back edge of the tray table, however it is contemplated that the support 108 may be angled slightly in some embodiments.

In one or more embodiments, the support 108 may be an excavated portion of the tray table 104 configured to accept a portable electronic device. For instance, the support 108 may be a cavity 132 formed in the body 136 of the tray table 104 for instance. For example the cavity 132 may be a slot or groove. The cavity 132 may comprise a front wall 140 and a back wall 144, and one or more sidewalls 148.

It is noted that the tray table 104 may include one or more magnets 164 at or near its top surface 112 to hold a portable electronic device on the top surface. In operation, the magnets 164 would be attracted to a magnetic structure within the portable electronic device, thus holding the portable electronic device. Though shown at particular locations in FIG. 1A, it is contemplated that the magnets 164 may be at various locations of the tray table 104. In addition, fewer or additional magnets 164 may be provided in one or more embodiments.

Figure 1B:
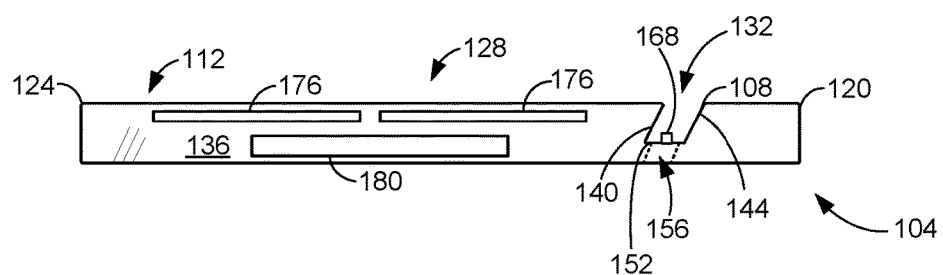
FIG. 1B is a cross sectional view of an exemplary tray table with support.
Figure 1C:
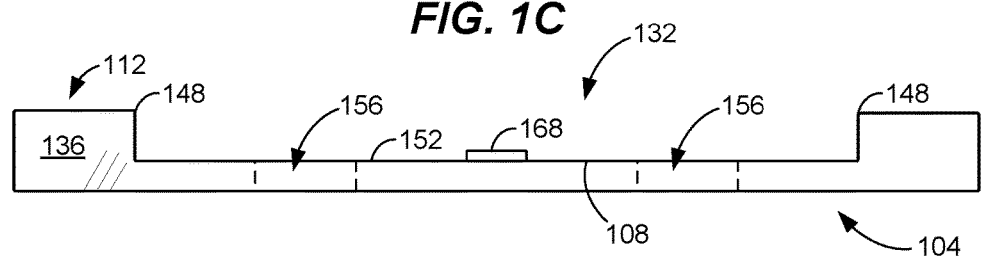
FIG. 1C is a cross sectional view of an exemplary tray table with support.

FIGS. 1B-1C provide cross sectional views of the tray table 104 and support 108. FIG. 1B is a cross sectional view across Line 1, while FIG. 1C is a cross sectional view across Line 2. As can be seen, the cavity 132 may have a bottom 152 to provide support to a portable electronic device thus preventing the device from sliding out of the support 108 through its bottom. It is noted that the bottom 152 may have one or more openings 156 to allow ventilation and to allow any spilled liquids or other debris to fall out of the support 108. This aids in keeping the support clean.

It is contemplated that the support 108 may be configured to provide connectivity to any device it is holding. For instance, in one embodiment, the support 108 may optionally include an electrical, optical, or other connectors 168 to provide power or data connections from a power or data source to a portable electronic device. If a connector 168 is provided, it is contemplated that one or more magnets may optionally be used to secure a connector 168 to a portable electronic device. In some embodiments, the support 108 may provide wireless connectivity for power transmission or data connections. For example, the support 108 may provide inductive battery charging or a short-range data connection (such as a Bluetooth™ connection) to portable electronic devices via one or more coils 176 or antennas. The tray table 104 may contain its own power source, such as one or more batteries 180, and/or may be connected to an aircraft's power system. The batteries may be rechargeable. In one or more embodiments, the batteries may be held in a compartment within the tray table 104 and be removable therefrom, such as for replacement, recharging, or both.

FIG. 1D illustrates a cross sectional view of an additional embodiment of the support 108. As can be seen, the cavity 132 may be "L" shaped thus providing a bottom 152 to support a portable electronic device. The lower portion of the "L" shape terminates at an opening near the back end of the tray table 104. This is advantageous in that it causes any fluids (or other dirt/debris) to flow toward the back of the tray table. In the event of a spill, such fluids would exit the tray table 104 away from the passenger as much as possible. It is noted that rather than forming the entire cavity 132 into an "L" shape, one or more channels/openings, could form the bottom of the "L" shape and guide fluids (or other dirt/and debris) toward the back of the tray table.

It is contemplated that a removable liner may be provided in some embodiments to aid in keeping the support clean. The liner may conform to the cavity 132 and may removed and replaced with a new liner when dirty. Alternatively or in addition, a plug, cap or other or covering may be provided to fill the cavity 132 to prevent dirt or debris from entering the support 108. Typically, the plug or cover would have a planar top positioned flush with the top surface 112 of the tray table 104, when inserted into the cavity 132. It is contemplated that the plug or cover may be affixed to the cavity 132 in some embodiments. For instance, the plug or cover may be a spring loaded or other biased mechanism that may be depressed downward to provide access to the cavity 132, thereby allowing an electronic device 204 to be inserted into the support 108. When not depressed, the biasing mechanism would raise the plug or cover such that it is flush with the top surface 112 of the tray table.

Referring to FIG. 1B, the support 108 may be angled in one or more embodiments. For instance, the support 108 may have a back wall 144 and/or front wall 140 that is at a non-perpendicular angle to the top surface 112 or body 136 of the tray table. As will be described further below, this allows the support 108 to hold a portable electronic device at an angle, which causes the device to face a seated passenger for ideal viewing. In one or more embodiments, the support 108 will be angled rearward towards the back end or edge of the tray table 104 to accomplish this.

It is contemplated that the cavity 132 may have various other cross sectional shapes as well. For example, the front wall 140 and back wall 144 may form a "V" or other shape that tapers from the top surface 112 of the tray table 104. This allows portable electronic devices of various thickness to be inserted into and securely held by the cavity 132. Alternatively or in addition, the cavity 132 may have a stepped cross section to produce a set of discrete widths between the front wall 140 and back wall 144. In other words, the front wall 140 and/or back wall 144 may be shaped like steps. This also allows portable electronic devices of various thicknesses to be supported by the cavity 132.

FIG. 1E is a bottom view of the tray table 104 showing the opening 156, which allows dirt and debris to exit the support 108. As can be seen, the opening 156 extends to the bottom surface 160 of the tray table 104 so that dirt and debris can fall out of the tray table 104. The opening 156 will typically be smaller than the cavity 132 so that an electronic device may be supported therein without falling through the opening. For example, the opening 156 may have a smaller width and/or length than the support 108. Though shown as a single opening 156 in FIG. 1E, it is contemplated that a plurality of openings may be used.

In addition, an opening 156 may be formed in various shapes and sizes. For example, an opening may have a length of 1-2 inches in some embodiments. This is advantageous in that such opening 156 is large enough to allow dirt and debris to escape while not being so large as to result in a smaller electronic device (such as a phone or other handheld device) to fall through the opening. In one or more embodiments, the bottom 152 of the support 108 may slant towards the opening 156 so as to guide dirt and debris toward the opening.

In one or more embodiments, the body 136 may be constructed to aid in cleaning the tray table 104. For example, the body 136 or portions thereof may be formed from material having anti-microbial or anti-bacterial qualities. In some embodiments, the body 136 or portions thereof may be coated with such materials. It is noted that only portions of the tray table 104, such as the top surface 112 may be formed from or coated with anti-microbial and/or anti-bacterial materials.

It is contemplated that a removable liner may be provided in some embodiments to aid in keeping the support clean. The liner may conform to the cavity 132 and may removed and replaced with a new liner when dirty. Alternatively or in addition, a cover 172, cap or other or covering may be provided to fill the cavity 132 to prevent dirt or debris from entering the support 108. Typically, the cover 172 would have a planar top positioned flush with the top surface 112 of the tray table 104, when inserted into the cavity 132, such as shown in FIG. 1F. FIG. 1F is a top view of an exemplary tray table 104 having a support 108. It is contemplated that the cover 172 may be affixed to the cavity 132 in some embodiments. For instance, the cover 172 may be a spring loaded or other biased mechanism that may be depressed downward to provide access to the cavity 132, thereby allowing an electronic device 204 to be inserted into the support 108. When not depressed, the biasing mechanism would raise the cover 172 such that it is flush with the top surface 112 of the tray table.

Figure 2:
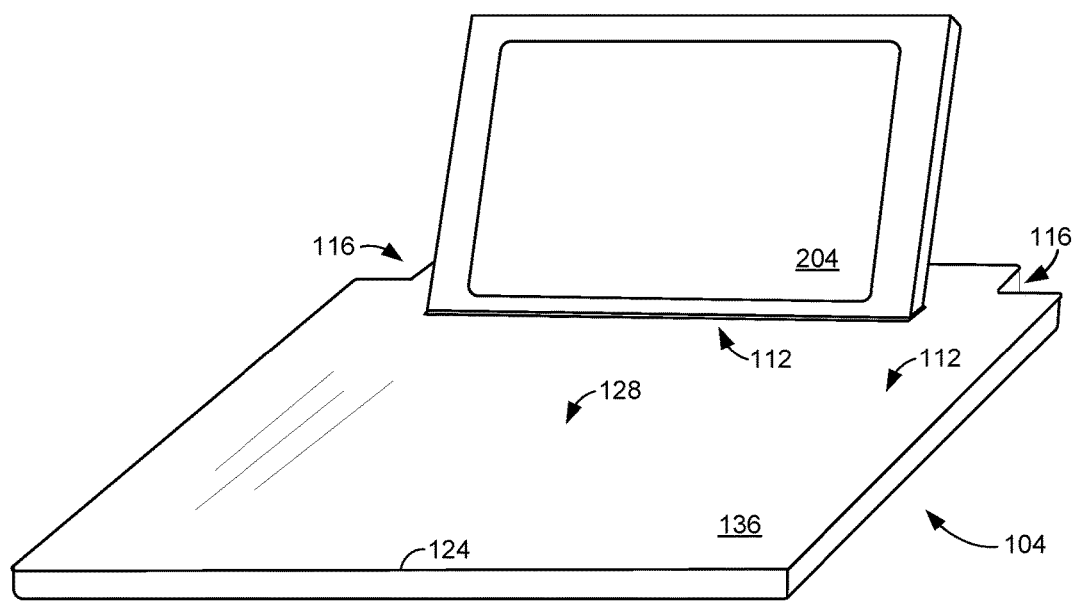
FIG. 2 is a perspective view of an exemplary tray table in operation.

FIG. 2 illustrates an exemplary tray table 104 having a portable electronic device 204 installed therein. As can be seen, the portable electronic device 204 may be held by the support 108 at a reclined angle, such as described above. It is contemplated that the support 108 may have a length selected to accommodate a variety of portable electronic devices. For instance, as can be seen from FIG. 2, the support 108 may accept a tablet device but also is sized to allow smaller devices, such as portable media players, smart phones, and portable gaming machines, to be held.

It is contemplated that the support 108 may be configured to provide connectivity to any device it is holding. For instance, the support 108 may have electrical, optical, or other terminals to provide power or data connections to a portable electronic device. In some embodiments, the support 108 may provide wireless connectivity to power or data connections. For example, the support 108 may provide inductive battery charging or a short-range data connection (such as a Bluetooth™ connection) to portable electronic devices. The tray table 104 may contain its own power source, such as one or more batteries, and/or may be connected to an aircraft's power system. The batteries may be rechargeable. In one or more embodiments, the batteries may be held in a compartment within the tray table 104 and be removable therefrom, such as for replacement, recharging, or both.

As disclosed above, the tray table may provide an adjustable support in some embodiments, such as to permit passengers to position their portable electronic devices at various angles. As will now be described with regard to FIGS. 3A-3C, the tray table 104 may include a rotatable assembly to allow such positioning.

Figure 3A:
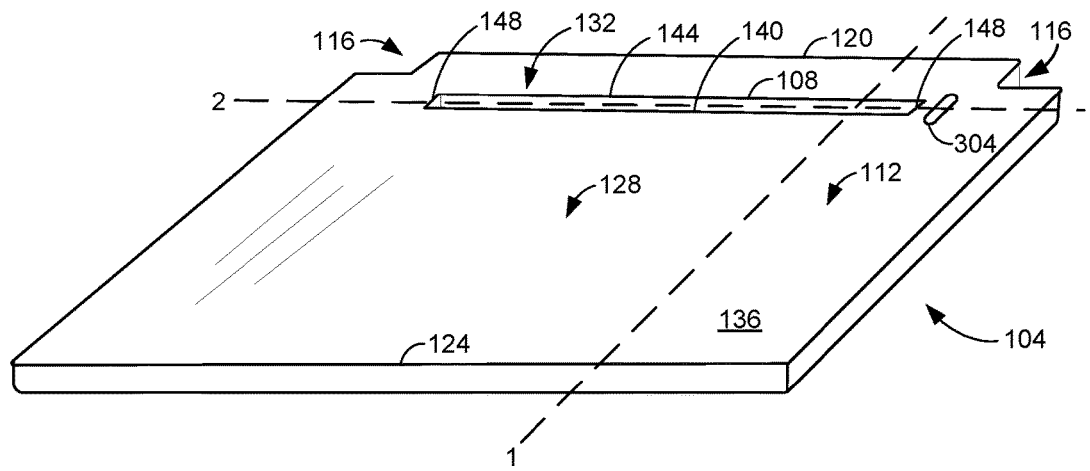
FIG. 3A is a top perspective view of an exemplary tray table with rotatable support.

FIG. 3A provides a top perspective view of the tray table 104. As can be seen, the outward appearance of an adjustable embodiment, may be similar to that disclosed above. In one or more embodiments, a control device 304 may be provided to allow the position of the support 108 to be changed. As shown, an adjustment wheel is provided as the control device 304. It is noted that various control devices, such as knobs, levers, sliders, buttons, or the like may be used to move the support 108. In addition, multiple control devices 304 may be provided. For instance an adjustment wheel or other control device 304 could be on both sides of the support 108 in some embodiments.

It is also noted that the support 108 may be biased (such as by one or more springs) in some embodiments. In this manner, the support 108 may be configured to automatically move or rotate to a particular position when a control device 304 is engaged, as will be described further below.

Figure 3B:
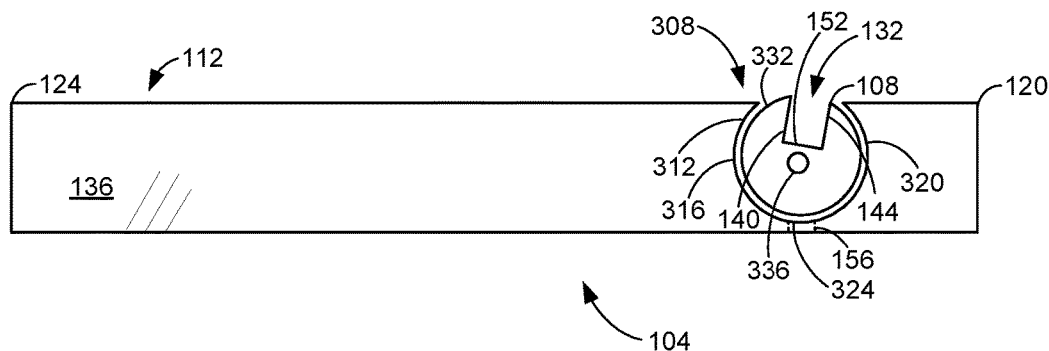
FIG. 3B is a cross sectional view of an exemplary tray table with rotatable support.

FIG. 3B provides a cross sectional view of the tray table across Line 1 of FIG. 3A. As can be seen the body 136 of the tray table 104 may be configured to accommodate a rotatable assembly 308. For example, as shown in the embodiment of FIG. 3B, a compartment 312 comprising a curved front and back wall 316, 320 configured to accept the rotatable assembly 308 while allowing the rotatable assembly to rotate or move within the compartment is provided. The compartment 312 may include a bottom 324 to enclose the rotatable assembly 308. An optional bottom 324 may be provided in some embodiments. It is noted that without a bottom 324, any dirt or debris that collects in the rotatable assembly 308 can be removed by rotating the assembly such that such debris can fall out of the assembly. Alternatively, and opening 156 may be formed in the bottom 324 of the compartment 312 to allow such dirt and debris to exit the assembly 308.

It is contemplated that the compartment 312 may extend from the top surface to the bottom surface of the tray table's body 136 in some embodiments. In this manner, the compartment 312 would have an opening at its top and bottom. This allows electronic devices to be received in the cavity 132 via the top opening of the compartment 312 while also allowing dirt and debris to exit the assembly via the bottom opening of the compartment. The body 332 of the rotatable assembly 308 may be sized to protrude from both the top and bottom opening of the compartment 312. In this manner, the body 332 itself forms a seal with the compartment 312 thereby preventing dirt and debris from entering the assembly 308.

The rotatable assembly 308 may comprise a body 332 having a cavity 132 therein to accept a portable electronic device. Similar to above, the cavity 132 may comprise a front wall 140, a back wall 144, and one or more sidewalls 148. A bottom 152 may be provided to prevent a portable electronic device from falling out of the cavity 132, such as described above. As can be seen, the cavity 132 may be angled to hold a portable electronic device at an angled position, such as described above. It is contemplated that the cavity 132 may be not be angled (i.e., be perpendicular to the axis of rotation) in some embodiments. With the rotatable assembly 308 for instance, a passenger may choose his or her desired angle by rotating the rotatable assembly. Thus, the cavity 132 itself may but need not be angled in all embodiments.

The body 332 or portion thereof of the rotatable assembly 308 may be rounded or cylindrical in one or more embodiments, such as to allow the rotatable assembly to rotate within the tray table 104. It is contemplated that the body 332 or portion thereof could have other cross sectional shapes. For example, the body 332 may be triangular, a pentagon, hexagon, or other shape. In some embodiments, the shape of the body 332 may be used to help hold the body 332 in position after it has been rotated. For example, the shape of the body may cause it to engage other surfaces of the tray table 104 thus holding the body in position.

One or more holding mechanisms may be used to hold the rotatable assembly 308 in a particular position. For example, a biased braking pad or other surface may press against the rotatable assembly 308 (such as at the body 332) to prevent the rotatable assembly from rotating out of a desired position. Other holding mechanisms, such as removable locking pins, detents, or the like could be used as well. In addition, it is contemplated that the body 332 may closely conform to its compartment 312 to hold itself in position once rotated to a desired position.

Figure 3C:
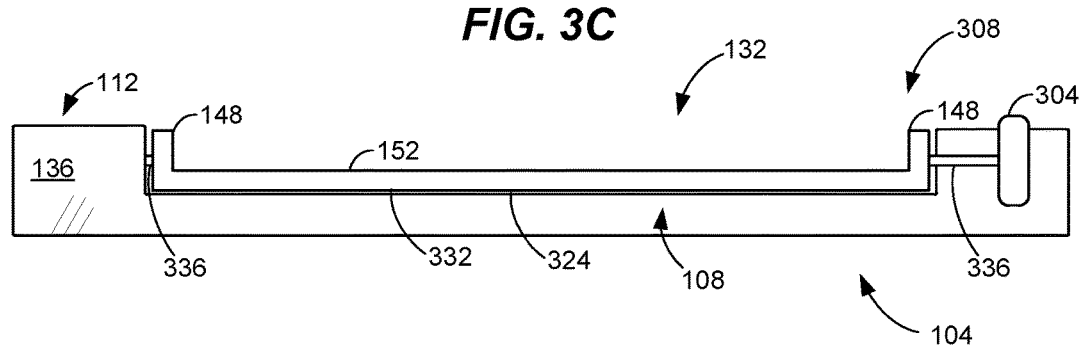
FIG. 3C is a cross sectional view of an exemplary tray table with rotatable support.

FIG. 3C illustrates a cross sectional view of the tray table 104 across Line 2 of FIG. 3A. As can be seen, the rotatable assembly 308 may comprise one or more axels 336 upon which its rotation may be accomplished. The axels 336 may extend to engage a portion of the rotatable assembly's compartment 312 to support the rotatable assembly 308 therein.

As shown in FIG. 3C, an axel 336 may also be mechanically linked to a control device 304 in one or more embodiments. In this manner, the axel 336 and thus the rotatable assembly 308 may be rotated by manipulating a control device 304. For example, in FIG. 3C rotating the control device 304 also rotates the rotatable assembly 308. It is noted that one or more biasing devices, such as springs, may engage or be attached to an axel 336 as well. This allows the rotatable assembly 308 to automatically move to a particular position when a biasing device is activated. For example, a biasing device may be configured to rotate the cavity 132 of the rotatable assembly 308 such that it is accessible from the top of the tray table 104. Alternatively, a biasing device could rotate the cavity 132 such that it is inaccessible, thus "closing" the support 108. This may be desirable to prevent unwanted dirt or debris from entering the cavity 132, such as during food service on a flight.

Figure 4A:
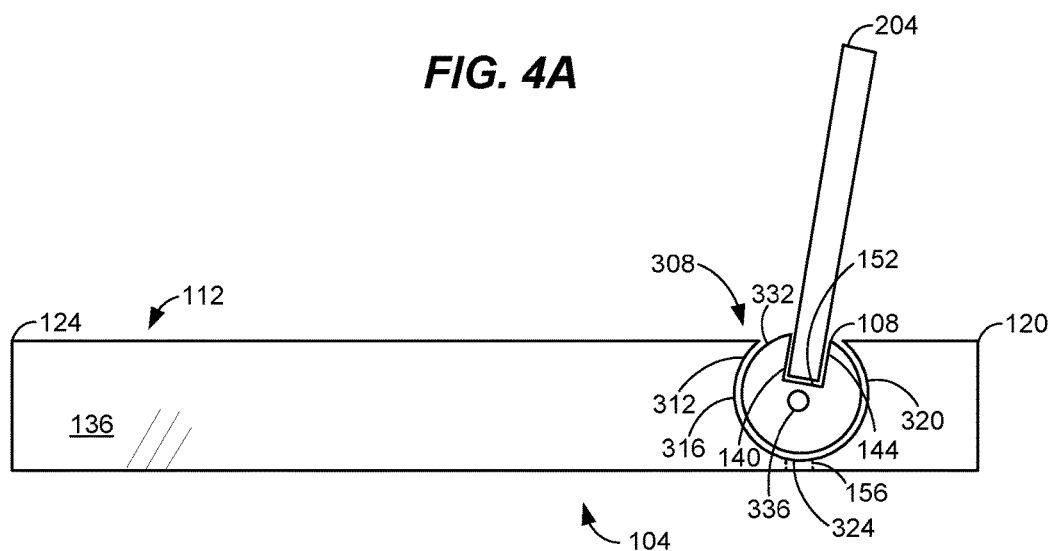
FIG. 4A is a cross sectional view of an exemplary tray table with rotatable support in operation.
Figure 4B:
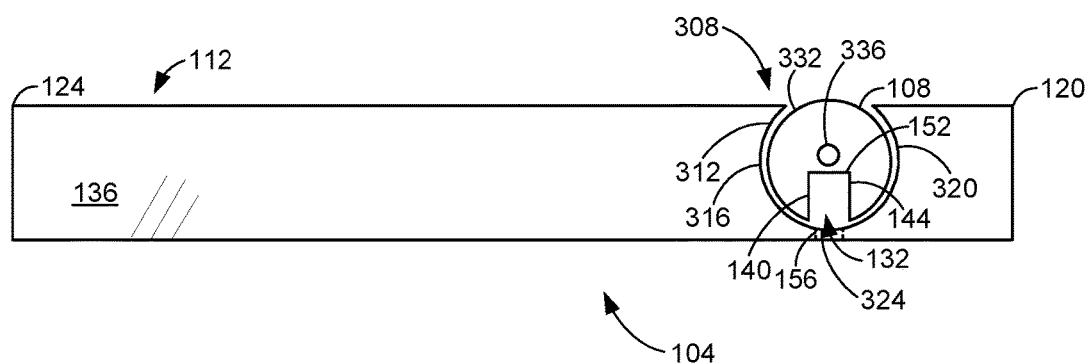
FIG. 4B is a cross sectional view of an exemplary tray table with rotatable support in operation.

FIGS. 4A-4B illustrate a rotatable assembly 308 in operation. As can be seen, the rotatable assembly 308 may rotate from the open position shown in FIG. 4A to the closed position shown in FIG. 4B. In the open position, the cavity 132 of the rotatable assembly 308 is typically accessible, thus allowing one or more portable electronic devices 204 to be supported therein, such as shown in FIG. 4A.

When not in use, the rotatable assembly 308 may be rotated to a closed position, such as shown in FIG. 4B. As can be seen, the cavity 132 may not be accessible when in the closed position. As stated, this prevents dirt or debris from entering the cavity 132. In embodiments where the tray table's compartment 312 has an open bottom, the rotatable assembly 308 may be rotated to empty any dirt or debris that may have collected therein. It is noted that the compartment 312 may have a removable bottom to allow this cleaning process to occur.

It is noted that the cavity 132 of the tray table 104 may be configured to protect any portable electronic devices it holds. For example, in one or more embodiments, the cavity 132 or portions thereof may be padded or be coated with non-abrasive surfaces to prevent the cavity from scratching or otherwise damaging the enclosure of a portable electronic device.

Figure 4C:
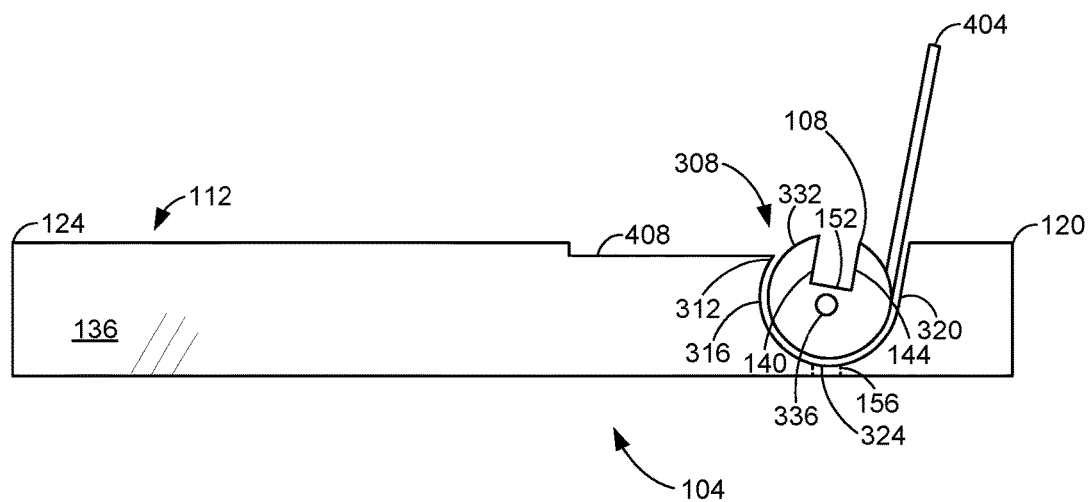
FIG. 4C is a cross sectional view of an exemplary tray table with rotatable support in operation.
Figure 4D:
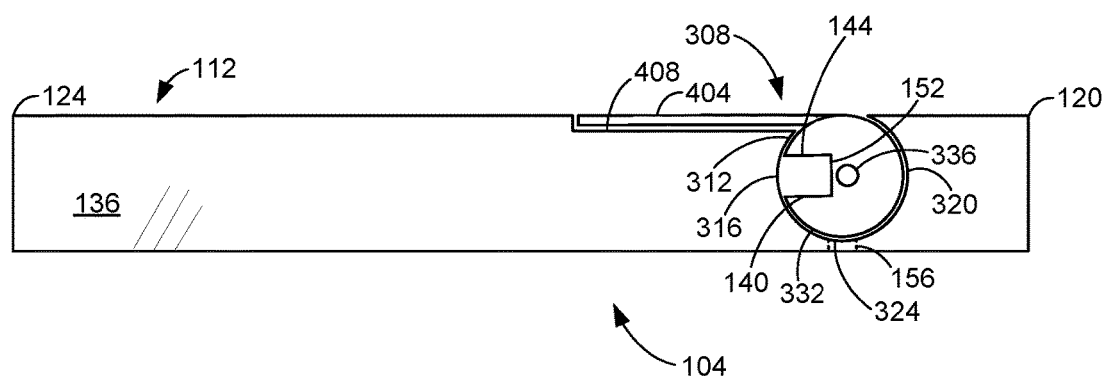
FIG. 4D is a cross sectional view of an exemplary tray table with rotatable support in operation.
Figure 4E:
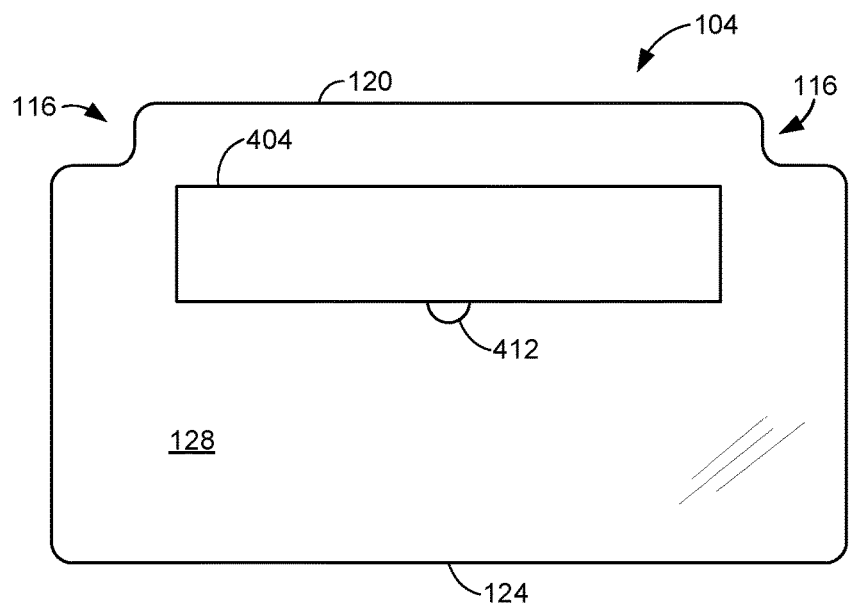
FIG. 4E is a top view of an exemplary tray table with rotatable support in operation.

FIGS. 4C-4E illustrate another rotatable assembly 308 in operation. As can be seen, an elongated tab 404 extends from the body 332 of the rotatable assembly. The elongated tab 404 may be an elongated member, planer structure, or the like which extends from the body 332. In operation, a bottom portion of an electronic device may be placed in the support 108 while an upper portion is propped up against (i.e., held by) the tab 404. This can be seen from FIG. 4C, which illustrates the rotatable assembly 308 in an open position.

FIGS. 4D-4E illustrate the rotatable assembly 308 in a closed position. In one or more embodiments, the body 136 of the tray table 104 may have a recess 408 formed therein to accept the tab 404. In this manner, when closed, the rotatable assembly's tab 404 is positioned flush with the top surface 112 of the tray table 104. This prevents the rotatable assembly 308 from obstructing use of the tray table and provides a planar surface for placement of one or more items. In addition, as can be seen from FIGS. 4D-4E, the tab 404 also encloses the compartment 312 preventing dirt and debris from entering. A cutout or recess 412 may be provided to allow the tab 404 to be lifted in some embodiments.

Though shown in a compartment 312 having a bottom 324, it is noted that a bottom need not be provided in all embodiments having a rotatable assembly 308. For instance, as described above, the compartment 312 may have an open bottom to allow dirt and debris to exit the compartment. Alternatively, one or more openings may be formed in the bottom 324, such as described above with regard to FIG. 3B, to allow dirt and debris to exit the compartment 312.

Figure 4F:
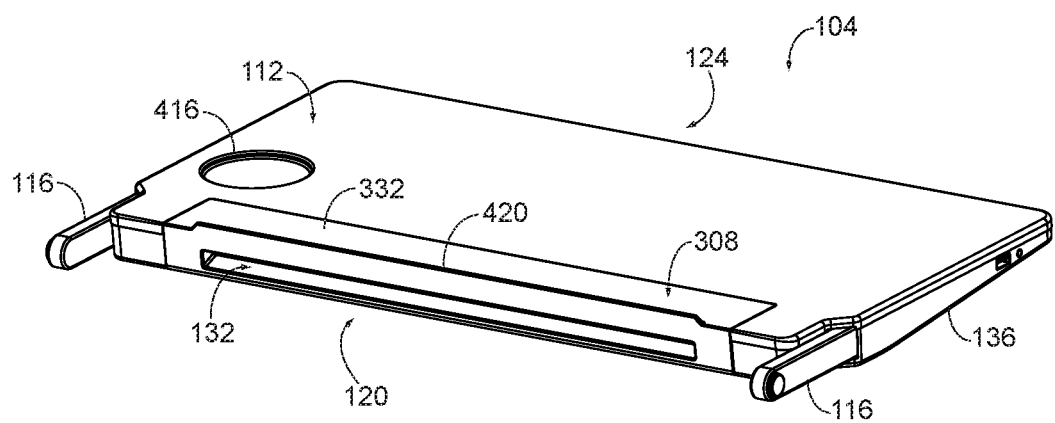
FIG. 4F is a back perspective view of an exemplary tray table with rotatable support. in a closed position.
Figure 4G:
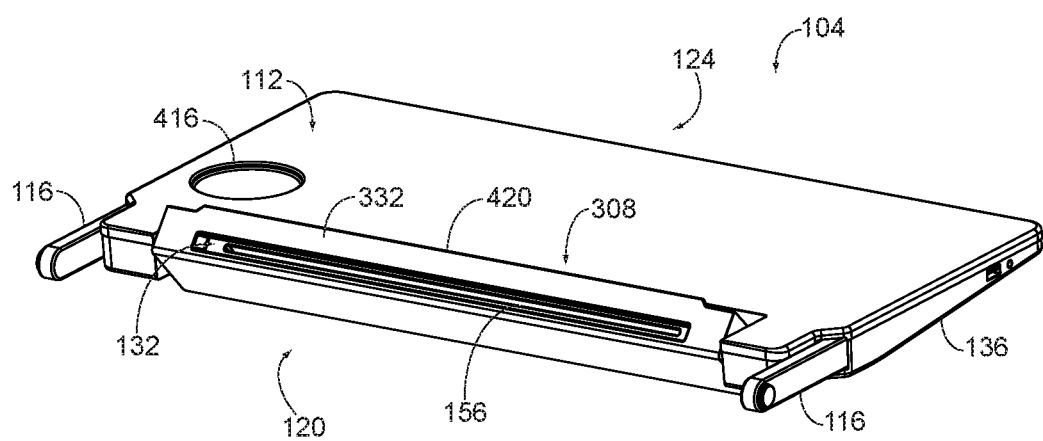
FIG. 4G is a back perspective view of an exemplary tray table with rotatable support in an intermediate position.
Figure 4H:
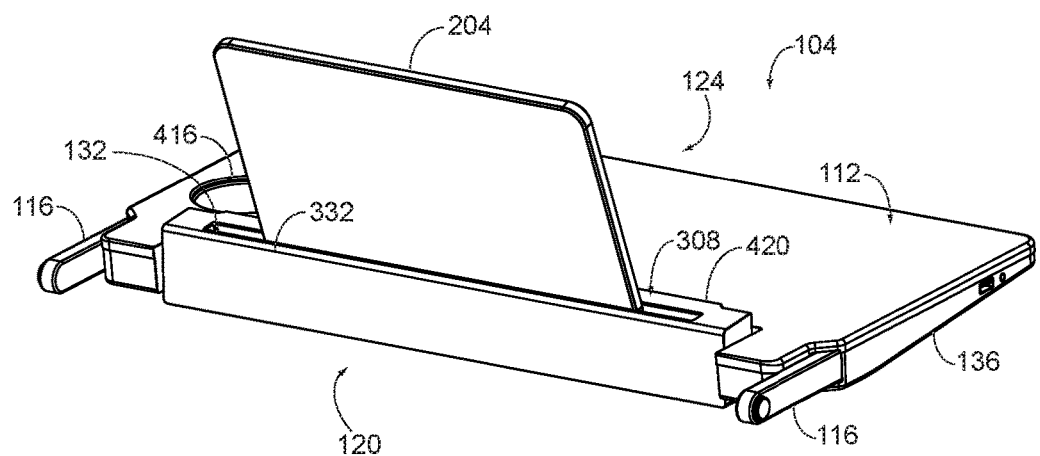
FIG. 4H is a back perspective view of an exemplary tray table with rotatable support in an open position.
Figure 4I:
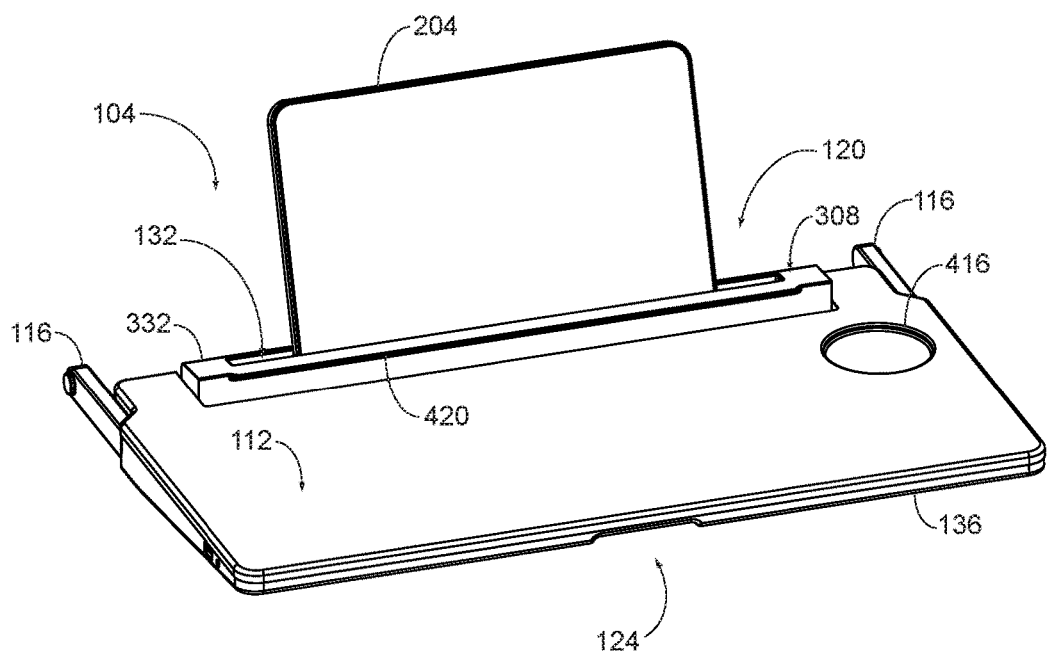
FIG. 4I is a front perspective view of an exemplary tray table with rotatable support in an open position.

FIGS. 4F-4I illustrate another exemplary tray table 104 having a rotatable assembly 308. FIGS. 4F-4G provide a back perspective view of the tray table 104. FIGS. 4H-4I respectively provide a back and front perspective view of the tray table 104. As can be seen, the rotatable assembly 308 may be formed at the back end 120 of the tray table 104 rather than inset from the back end as described with regard to the above embodiment. The rotatable assembly 308 may comprise a body 332 having a cavity 132 for receiving and securing a portable electronic device 204.

The body 332 may be an elongated structure having flat sides. For instance, as shown in FIGS. 4F-4I, the body 332 is a rectangular shape extending laterally between a left and right side of the tray table 104 at the back end 120 of the tray table. In one or more embodiments, a lip 420 may extend from a portion of the body 332. As can be seen from FIG. 4F, the lip 420 may extend from a top portion of the body 332 so that it forms a barrier to prevent items on placed on the top surface 112 of the tray table 104 from sliding off the back end 120 of the tray table.

The cavity 132 will typically extend along the length of the body 332, such as shown. In one or more embodiments, the cavity 132 may be an elongated opening configured to accept a portion of one or more portable electronic device 204. As shown in FIGS. 4H-4I for example, the cavity 132 comprises a rectangular opening sized to accept an edge or end of a portable electronic device 204. This secures the portable electronic device 204 within the body 332 and allows a user to use the portable electronic device 204 without having to hold the portable electronic device.

Positioning the body 332 of the rotatable assembly 308 at the back end 120 of the tray table is advantageous in that it allows the cavity 132 to be exposed at the back end of the tray table. When the tray table 104 is in a stowed position, it will typically be in a vertical orientation with the front end 124 of the tray table being above the back end 120 of the tray table. In this manner, any dirt or debris in the cavity 132 would automatically fall out of the cavity keeping the cavity clean and unobstructed. Maintenance or other personnel may then collect such dirt and debris from the floor of the aircraft.

One or more openings 156 may be at the bottom of the cavity 132 in one or more embodiments to also aid in keeping the cavity clean. Typically, an opening 156 will extend from the bottom of the cavity 132 to an external surface of the body 332. This allows any dirt or debris that enters the cavity 132 to fall out of the cavity keeping the cavity clean. FIG. 4G illustrates an exemplary opening 156.

FIGS. 4F-4I also illustrate operation of the tray table 104 as its rotatable assembly 308 rotates from a closed position, as shown in FIG. 4F, to an open position as shown in FIGS. 4H-4I. FIG. 4G illustrates the rotatable assembly 308 in an intermediate position as it rotates between an open and closed position.

In the closed position, the body 332 of the rotatable assembly 308 forms a portion of the top surface 112 of the tray table 104. For instance, as shown in FIG. 4F, the top portion of the rotatable assembly's body 332 is coplanar with the top surface 112 of the tray table 104. In this manner, the rotatable assembly 308 does not obstruct or hinder use of the tray table 104 when in the closed position. A passenger is therefore free to place items on the top surface 112 of the tray table 104 as desired. For example, the passenger may place food service items such as plates, cups, and utensils on the top surface 112. As shown in FIG. 4F, an optional cup holding inset 416 is provided to receive cups or the like. The lip 420 extends upward at the back end 120 of the tray table 104 to prevent items from falling off the back end of the tray table.

When use of a portable electronic device 204 is desired, the rotatable assembly 308 may be rotated to expose a cavity 132. As can be seen, the body 332 of the rotatable assembly 308 may be rotated such that the cavity 132 moves in an arc starting at the back end 120 of the tray table. FIG. 4G illustrates the body 332 having been moved from the closed position of FIG. 4F. As the rotation of the body 332 continues, the cavity 132 moves upward thereby positioning the cavity to receive a portable electronic device 204, such as shown in FIG. 4H-4I. In this open position, the cavity 132 holds the portable electronic device upright for use. FIGS. 4H-4I respectively provide a back and front perspective view of the tray table 104 with its rotatable assembly 308 in an open position and holding a portable electronic device 204.

In one or more embodiments, the rotatable assembly 308 may be configured such that the opening of the cavity 132 is positioned above the top surface 112 of the tray table 104 when the rotatable assembly is in an open position, such as shown in FIGS. 4H-4I. This is advantageous in that the higher elevation helps prevent any dirt and debris that may be on the top surface 112 of the tray table 104 from entering the cavity 132.

Figure 4J:
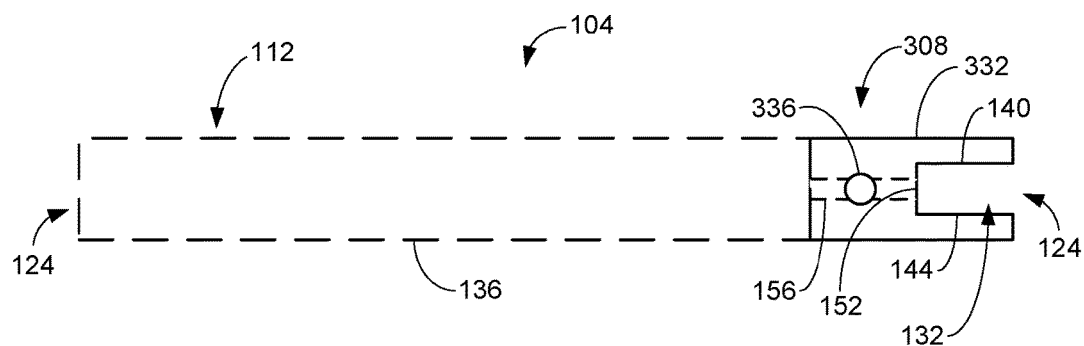
FIG. 4J is a side cross sectional view of an exemplary tray table with rotatable support in operation.
Figure 4K:
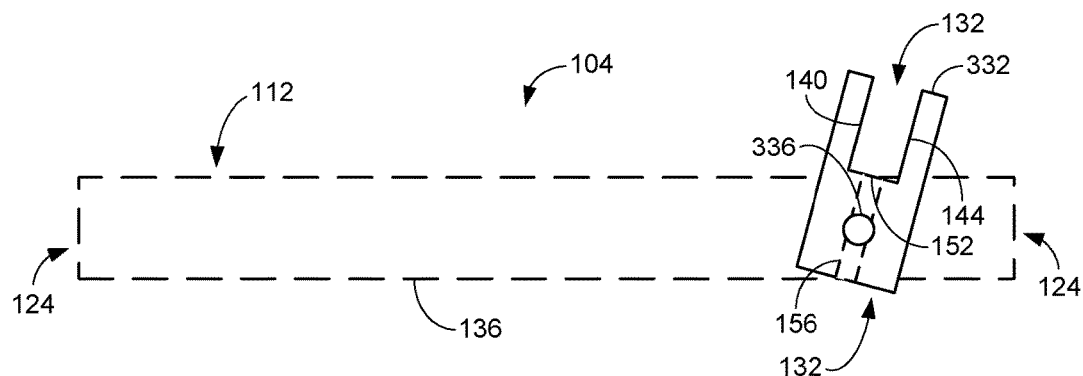
FIG. 4K is a side cross sectional view of an exemplary tray table with rotatable support in operation.

FIGS. 4J-4K illustrate side cross sectional views of the rotatable assembly 308 of FIGS. 4F-4I in operation. FIG. 4J shows the rotatable assembly 308 in a closed position while FIG. 4K shows the rotatable assembly in an open position. As can be seen, the cavity 132 is oriented toward the back end 120 of the tray table 104 in the closed position, while the cavity 132 is oriented upward to receive a portable electronic device 204 in the open position.

As described above, the cavity 132 may comprise a front wall 140, a back wall 144 and one or more sidewalls 148. The bottom 152 of the cavity 132 engages an edge or end of a portable electronic device to support the portable electronic device. An optional opening 156 at the bottom of the cavity 132 allows dirt and debris to exit the cavity, as described above. As can be seen from FIG. 4K for example, in the open position, dirt or debris that enters the cavity 132 would fall into the opening 156 and out of the body 332. It is noted that dirt and debris that is too large to fit into the opening 156 would fall out of the cavity 132 when the tray table 104 is put in a stowed position, as described above.

Figure 4L:
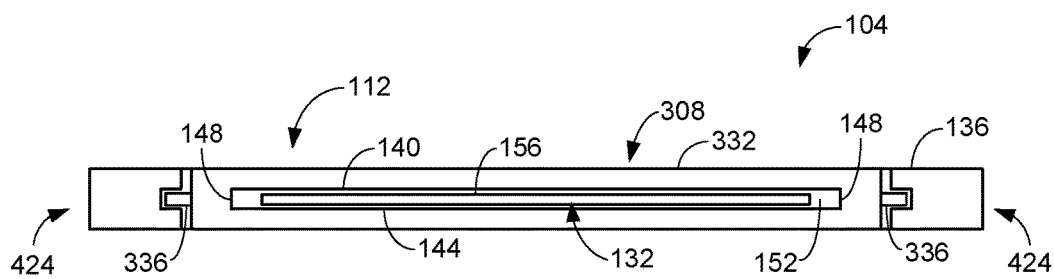
FIG. 4L is a back cross sectional view of an exemplary tray table with rotatable support in operation.

The body 332 of the rotatable assembly 308 may be mounted to the tray table 104 via one or more rotatable mounts. FIG. 4L illustrates a back cross sectional view of the rotatable assembly 308 where the body 332 of the rotatable assembly is mounted to the body 136 of the tray table 104 via a pair of axels 336. As can be seen, the axels 336 may extend from the left and right or lateral ends 424 of the body 332 and into a portion of the tray table's body 136 (or vice versa). The body 332 can thus rotate about the axels 336 between the closed and open positions, as shown respectively in FIGS. 4J-4K.

Figure 5A:
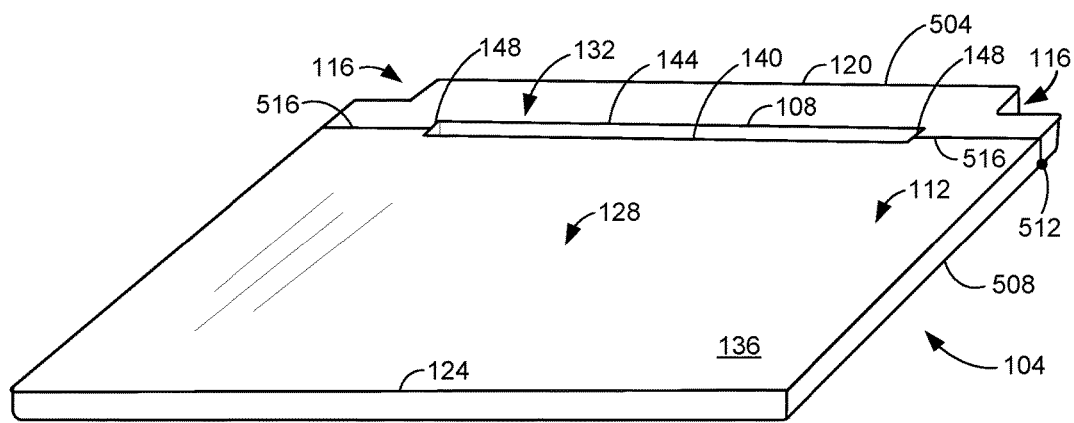
FIG. 5A is a top perspective view of an exemplary tray table with support having separable portions.
Figure 5B:
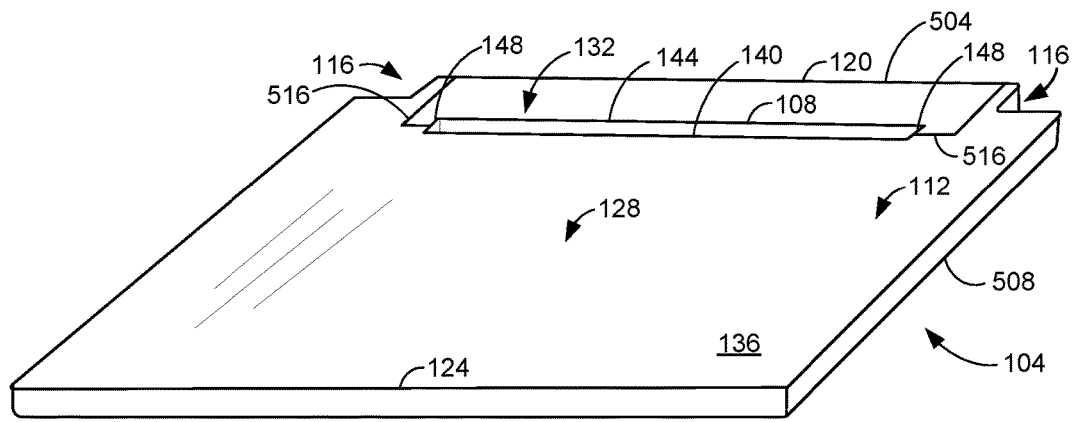
FIG. 5B is a top perspective view of an exemplary tray table with support having separable portions.
Figure 5C:
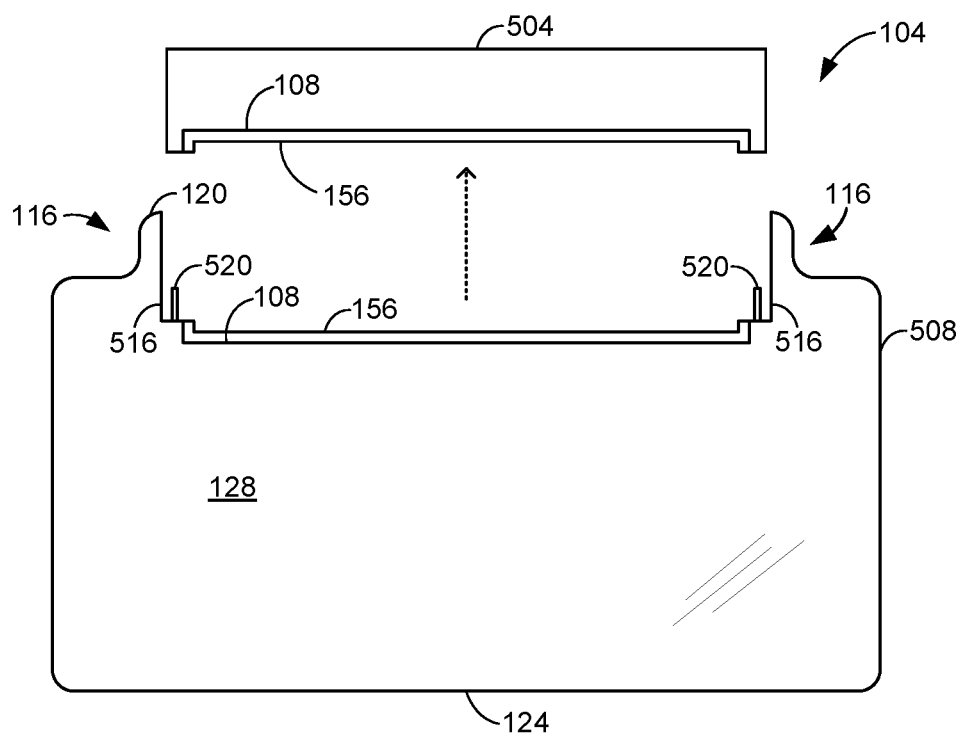
FIG. 5C is a top view of an exemplary tray table with support having separable portions in use.

It is contemplated that some embodiments of the tray table 104 may comprise movable or removable portions to allow for cleaning and maintenance. Referring to FIGS. 5A-5C for example, a first portion 504 of the tray table 104 may be configured to separate from a second portion 508 of the tray table. at one or more separations 516. In one or more embodiments, the two portions 504, 508 may meet at or near the support 108. In this manner, the two portions 504, 508 would be separable at or near the support, such as delineated by Line 2 of FIG. 5. shown. Once separated, access to an interior portion of the support 108 is more easily achieved, such as to clean or maintain the support 108 or any elements associated with the support (such as adjustable elements).

One or more fasteners 512 may be used to allow the first portion 504 and second portion 508 to removably attach to one another. For example, as shown, the tray table 104 may comprise one or more hinges that allow the first and second portions 504, 508 to fold relative to one another, thereby providing access to an interior portion of the support 108. It is contemplated that the hinge may include a biasing mechanism and or locking mechanism to hold the first and second portions 504, 508 in a planar configuration (such as shown in FIG. 5A) during use. One or more additional fasteners 512 such as screws, pins, claps, magnets or the like may also or alternatively be used to hold the first and second portions 504, 508 in the planer configuration.

Alternatively, the first and second portions 504, 508 may be completely separable form one another, such as in the embodiments of FIGS. 5B-5C. For example, the first and second portions 504, 508 may be configured to pull apart when detached from one another. In such embodiments, FIG. 5C illustrates the tray table 104 having its first and second portions 504, 508 separated from one another.

It is noted that the first and second portions 504, 508 may comprise mating surfaces or structures that secure the first and second portions together when connected. For example, the first and second portions 504, 508 may have grooves, slots, tabs, or the like that correspond to one another. It is noted that, similar to Also, as stated above, one or more additional fasteners 512 may be used to secure the first and second portions 504, 508 in a planar configuration. As shown in FIG. 5C for example, one or more pins 520 may connect and secure the first and second portions 504, 508 together when assembled.

It is contemplated that, when mounted to an aircraft passenger seat, only the first or second portion 504, 508 would be attached to the tray table support arms of the seat. This permits the first and second portions 504, 508 to be removable from one another (such as to clean or maintain the support 108) without removing the tray table 104 from the seat. Alternatively, both the first and second portions 504, 508 may be attached to the tray table support arms, such as to secure the first and second portions together in a planar configuration. In such case, additional fasteners for holding the first and second portions together need not be used.

FIGS. 6A-6F illustrate various slots or cavities 132 having biasing mechanisms 604 that may be used to help hold or secure a portable electronic device 204. In general, a biasing mechanism 604 applies force to a portable electronic device 204 to increase friction between the portable electronic device and a cavity 132 in which it has been inserted. For instance, a biasing mechanism 604 may clamp or squeeze a portion of a portable electronic device 204 to help secure the portable electronic device within a cavity 132. As can be seen from FIG. 6A-6F, a biasing mechanism 604 may be used in embodiments with a fixed support 108 or rotating assembly 308, including those disclosed above.

FIGS. 6A-6B provide a side cross sectional view of a first biasing mechanism 604 in operation. As can be seen, a biasing mechanism 604 may comprise a presser 620 that applies force to a portable electronic device 204 to help secure the portable electronic device. In the embodiment of FIGS. 6A-6B, the presser 620 is pivotally attached to the body 132 of a tray table 104 at a mount 624 within a cavity at back end 120 of the tray table via a connecting rod 616. It is noted that a pivot or rotating mount may attach the connecting rod 616 at either or both of its ends. The presser 620 is biased or pushed into a cavity 132 of the tray table 104 by one or more biasing devices 612. This causes the presser 620 to protrude into the cavity 132.

A presser 620 may also be coupled to one or more biasing devices 612, such as various springs, elastic or other resilient device/material. A variety of biasing devices 612 are illustrated in FIGS. 6A-6B. It is contemplated that only a single biasing device 612 is needed in most embodiments however. It can be seen with reference to FIGS. 6A-6B that a biasing device may bias movement of a presser 620 at its pivot (e.g., at a rotating mount 624), at its connecting rod 616, or at the presser 620 itself.

In FIGS. 6A-6B, the biasing device 612 directly connected to the presser 620 expands to push the presser into the cavity 132, the biasing device connected to the connecting rod 616 compresses to pull the presser into the cavity, and the biasing device at the rotating mount 624 applies a rotational force with rotates the presser into the cavity. It is noted again that only a single biasing device 620 need be used in most embodiments. The presser 620 may protrude into the cavity 132 through an opening 608 in the back wall 144 (or front wall 140).

As can be seen from FIG. 6B, when a portable electronic device 204 is inserted in the cavity 132, the presser 620 is forced at least partially out of the cavity 132 to allow the cavity to accommodate the portable electronic device. In this position, the presser 620 continues to exert pressure or force on the portable electronic device 204 from its one or more biasing devices 612.

FIGS. 6C-6D provide a cross sectional view of a second biasing mechanism 604. As can be seen, the presser 620 in this embodiment is within the cavity 132 at a first wall 144 of the cavity. A biasing mechanism 612 applies force to push the presser 620 towards the opposite wall 140 of the cavity. Alternatively or in addition, a biasing mechanism 612 may be at a pivot point of the presser 620 and apply rotational force at such point to push the presser 620 towards the opposite wall. The presser 620 is pivotally or movably mounted to a mount 624, similar to above. It is noted that a presser 620 may move linearly rather than rotationally in some embodiments. For example, a presser 620 may extend and retract parallel to a front or back wall 140, 144.

As can be seen in FIG. 6D, when a portable electronic device 204 is inserted in the cavity 132, the presser 620 is forced back towards the first wall 144 to allow the cavity to accommodate the portable electronic device. In this position, the presser 620 continues to exert pressure or force on the portable electronic device 204 from its one or more biasing devices 612.

A presser 620 may be rounded, angled or both to prevent a presser 620 from obstructing entry of a portable electronic device 204 into a cavity 132. As can be seen in FIGS. 6A-6B for instance, the presser 620 is rounded and may rotate at the distal end of its connecting rod 616 to allow insertion of a portable electronic device 204 without obstruction. In the embodiment of FIGS. 6C-6D, the presser 620 has an angled distal end so as to also allow a portable electronic device 204 to be inserted into its cavity 132 without obstruction.

Figure 6E:
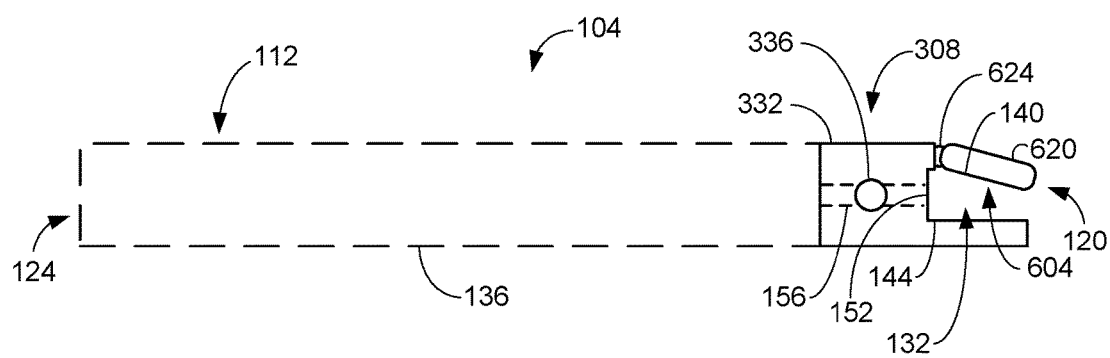
FIG. 6E is a cross sectional view of an exemplary tray table with rotatable support having a biasing mechanism.
Figure 6F:
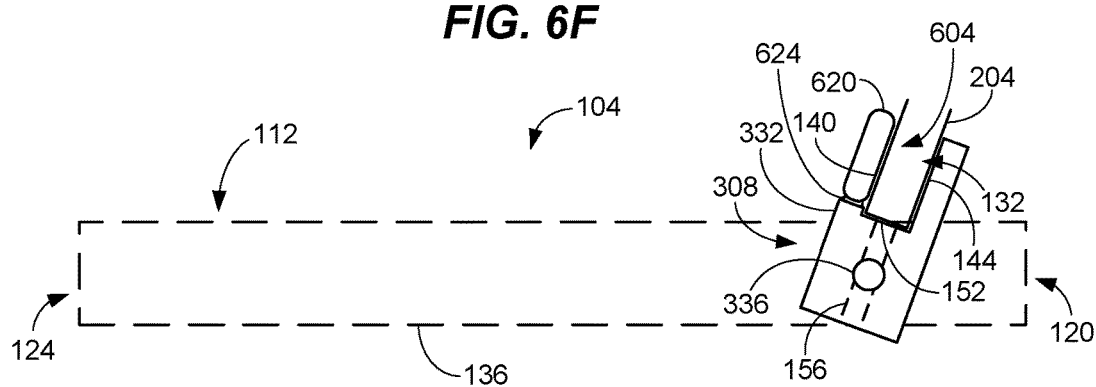
FIG. 6F is a cross sectional view of an exemplary tray table with rotatable support having a biasing mechanism.

FIGS. 6E-6F illustrate another embodiment of a biasing mechanism 604 where the presser 620 forms one of the walls 140 of the cavity 132. FIGS. 6E-6F also show that a biasing mechanism 604 may be used in embodiments having a rotating assembly 308.

As can be seen, the presser 620 in this embodiment is pivotally or movably mounted via a mount 624. A biasing device 612, such as a spring, is at the mount 624 and provides a rotational bias which forces or moves the presser 620 towards the opposite wall 144 of the cavity. In one or more embodiments, the biasing device 612 may be about or at a pivot or axel of a mount 624 to apply rotational force to the presser 620.

As can be seen from FIG. 6F, the bias of the presser 620 is overcome as a portable electronic device 204 is inserted into the cavity 132. The presser 620 is moved outward to accommodate the portable electronic device 204 and continues to apply inward pressure or force to help secure the portable electronic device in the cavity 132.

Though shown at or forming a front wall 140 or back wall 144 of a cavity 132 in FIGS. 6A-6F, it is contemplated that a biasing mechanism 604 may be at either or both walls 140, 144 of a cavity. In addition, it is contemplated that a presser 620 need not be pivotally or rotatably mounted in all embodiments. For example, a presser 620 may be mounted to a telescoping mount that moves in a linear inward and outward fashion. A biasing device 612 can be used to bias the telescoping mount outward to apply force or pressure to a portable electronic device 204 when inserted.

Figure 6G:
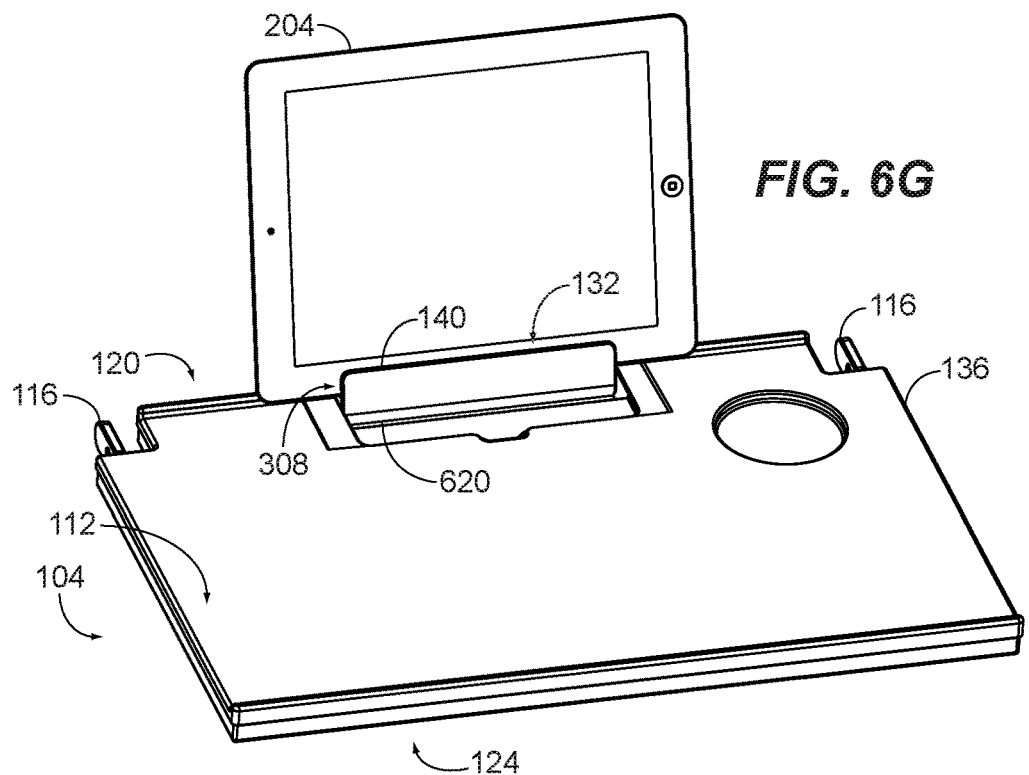
FIG. 6G is a perspective view of an exemplary tray table with rotatable support having a biasing mechanism.

FIGS. 6G-6K illustrate another exemplary embodiment comprising a rotatable assembly 308 and a presser 620. The perspective view of FIG. 6G illustrates the rotatable assembly 308 installed in an exemplary tray table 104 and rotated to an open position. A portable electronic device 204 is received within the cavity 132 of the rotatable assembly 308 and held for use by a passenger or other user. A body 332 of the rotatable assembly 308 may be rotatably mounted to a tray table 104 via one or more axels 336 (and openings 632 for receiving such axels), pivots or other rotatable mounts. Similar to above, the presser 620 is movable to receive and hold a portable electronic device with a cavity 132 of the rotatable assembly 308.

Figure 6H:
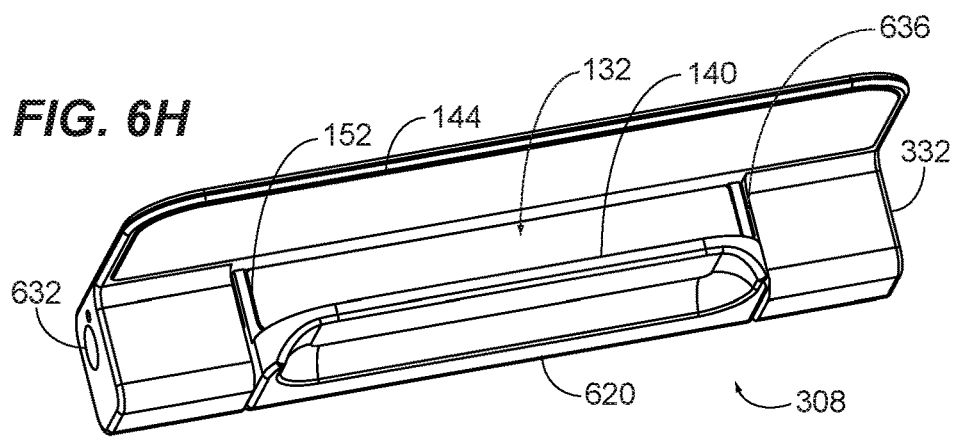
FIG. 6H is a top perspective view of an exemplary rotatable support having a biasing mechanism.
Figure 6I:
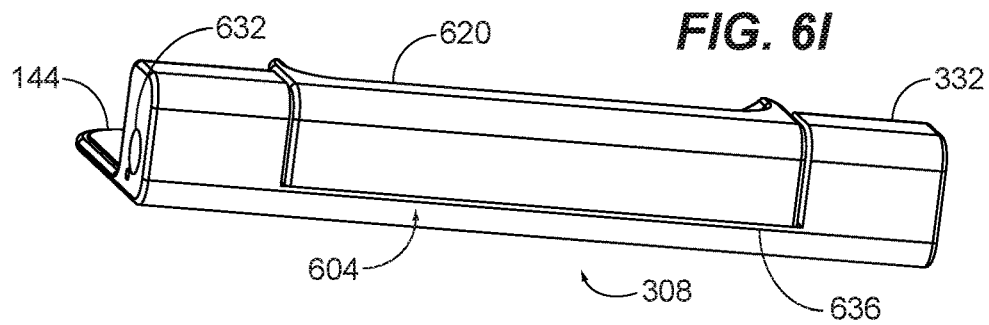
FIG. 6I is a bottom perspective view of an exemplary rotatable support having a biasing mechanism.
Figure 6J:
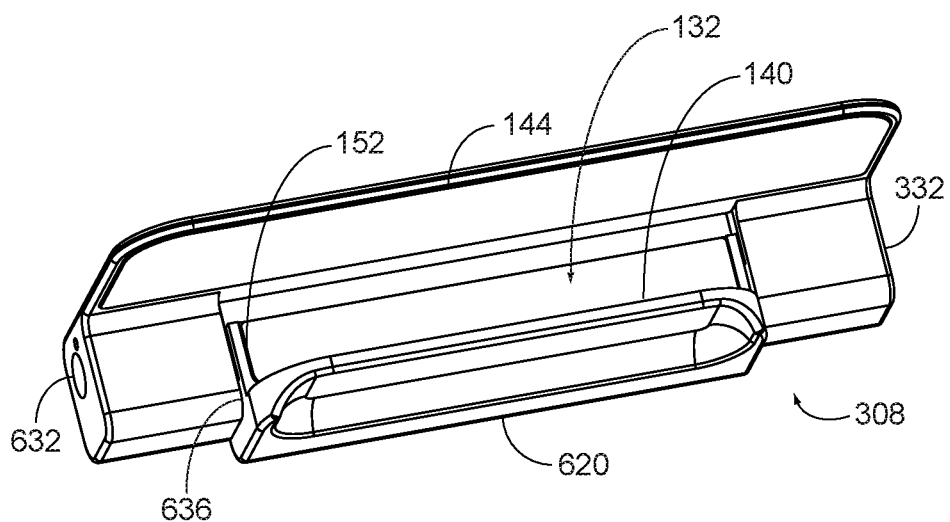
FIG. 6J is a top perspective view of an exemplary rotatable support having a biasing mechanism.
Figure 6K:
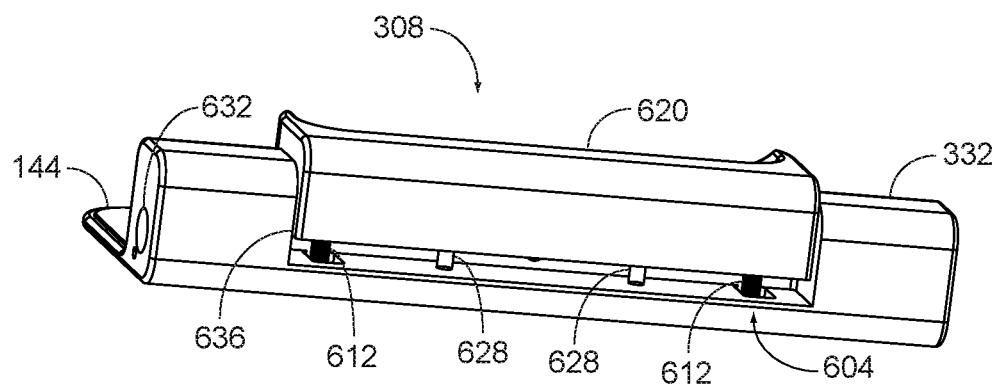
FIG. 6K is a bottom perspective view of an exemplary rotatable support having a biasing mechanism.

FIGS. 6H-6I respectively illustrate top and bottom perspective views of an exemplary presser 620 in a retracted position, while FIGS. 6J-6K respectively illustrate top and bottom perspective views of the presser in an extended position. As can be seen, the presser 620 may form or comprise a front wall 140 and bottom 152 of a cavity 132 and be movable (i.e., extendable and retractable) therewith. A body 332 of a rotating assembly 308 may comprise a notch 636 to receive a presser 620. It can be seen from FIGS. 6H and 6J for example, that the body 332 comprises a central notch 636 where the presser 620 is movably mounted.

In a retracted position the front wall 140 and back wall 144 are closer to one another as compared to an extended position. This allows a cavity 132 to accommodate portable electronic devices of various widths. Also, a biasing mechanism 604 may apply a force to move the presser 620 (and therefore the front wall 140) toward the back wall 144. This too helps secure a portable electronic device within a cavity 132.

As can be seen from FIG. 6K, one or more biasing devices 612 may be used to produce such force. In the embodiment of FIG. 6K for example, biasing devices 612 comprising springs extend between the body 332 of the rotatable assembly 308 and the presser 620. The biasing devices 612 apply force causing the presser 620 to be biased to a retracted position, such as that shown in FIG. 6I.

It is noted that a biasing mechanism 604 may include one or more guides 628 to guide or control the movement if a presser 620. As shown in FIG. 6K for example, one or more guide pins 628 extend from the body 332 and into corresponding openings of the presser 620 to guide the movement of the presser as it moves between an extended and retracted position. A pin 628 may have an enlarged distal end to prevent the presser 620 from extending beyond a predefined point. It is contemplated that one or more guides 628, may be at the lateral ends of a presser 620 in some embodiments. For example, a linear channel may be formed in each lateral end of a presser 620 while corresponding rails extend from the sides of the notch 636 of a body 332, or vice versa.

In some embodiments, a biasing mechanism 604 need not be provided. In such embodiments, a presser 620 may be held in position by friction, such as between one or more pins 628 and their corresponding openings. Alternatively, one or more detents and corresponding tabs may be used to hold a presser 620 in position. For example, a detent or tab may be formed at the lateral ends of a presser 620 with a corresponding tab or detent at a body 332 of a rotatable assembly 308.

FIGS. 7A-7B illustrate a side view of an exemplary tray table 104 having a collapsible slot or cavity 132. As can be seen, a slidable or movable bracket 704 forms a back wall 144 and bottom 152 of the cavity, while a front wall 140 of the cavity 132 is formed by the tray table's body 136. The bracket 704 is slidable at a back end 120 of the tray table 104 to allow a cavity 132 to be expanded and collapsed.

For instance, the bracket 704 has been moved toward the tray table's body 136 in FIG. 7A. This collapses the cavity 132. In FIG. 7B, the bracket 704 has been moved outward from the body 136 to expand the cavity 132. Once expanded, a cavity 132 can receive, support and secure a portable electronic device therein, such as described above. It is noted that one or more biasing devices 612, such as springs, may pull the bracket 704 toward the body. This bias applies pressure or force to a portable electronic device to help secure the portable electronic device once inserted in the cavity 132. Alternatively or in addition, it is noted that the back wall 144 may be formed by a presser 620, such as described above with regard to FIGS. 6E-6F. In another embodiment, a presser 620, such as described with regard to FIGS. 6A-6D, may be at the front wall 140 or back wall 144 of the cavity.

Typically, a bracket 704 will comprise a base 716 and an upright 712. The base 716 and upright 712 may be perpendicular to one another such as shown in FIGS. 7A-7B. Alternatively, the base 716 and upright 712 may extend at various angles. For example, an upright 712 may be angled backwards to allow a portable electronic device to be supported at a reclined angle. It is noted that, in some embodiments, a portion of a tray table's body 136 may have a notch 708 or removed to accommodate the base 716 of a bracket 704. Alternatively a body 136 may have a slot or cavity therein to receive the base 716 of a bracket 704.

It is noted that a notch 708 need not be provided in every embodiment. For instance, in a retrofit where the bracket 704 is installed on a preexisting tray table 104 the bracket may be movably secured at a bottom surface of such tray table. Alternatively, a notch 708 may be machined or otherwise formed in the preexisting tray table 104.

One or more slides may be used to secure a bracket 704 to a tray table's body 136. A slide may comprise a rail, groove, or other structure that allows a bracket 704 to move inward and outward to respectively collapse and expand a cavity 132. In FIGS. 7A-7D, slides comprising a peg 720 and rail 724 movably attach the bracket 704 to the tray table's body 136. As can be seen, the pegs 720 have an enlarged head at their distal ends. One or more narrower pins extend from the enlarged head and are secured to the body 136. As shown in the bottom views of FIGS. 7C-7D, the one or more pins slide within rails 724 of the base 716 of a bracket 704, while the enlarged heads secure base 716.

In FIG. 7C, the cavity 132 is collapsed. The bracket 704 can then be slid outward to expand the cavity, such as shown in FIG. 7D. In an expanded position, the front wall 140 and back wall 144 are sufficiently separated to accept a portable electronic device. Thereafter, a portable electronic device can be inserted into the cavity. When no longer desired, the cavity 132 can again be collapsed by moving the bracket inward towards the tray table's body 136. This reduces the size of the tray table 104 allowing it to be stowed in a more space saving manner.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A tray table for supporting a planar portable electronic device in a vehicle comprising:
   a body having a planar shape;
   a fixed wall formed by a back end of the body;
   a sliding wall proximate the back end of the body, wherein the sliding wall slides from a first position where the sliding wall engages the fixed wall to a second position where the first wall is away from the fixed wall, wherein a cavity is formed between the fixed wall and the sliding wall for receiving the planar portable electronic device when the sliding wall is in the second position;
   a bottom between the fixed wall and the sliding wall that engages an edge of the planar portable electronic device when the planar portable electronic device is received in the cavity; and
   one or more mounts that attach the tray table to a portion of the vehicle.

2. The tray table of claim 1 further comprising a biasing device attached to the sliding wall.

3. A support for holding a planar portable electronic device in a vehicle comprising:
   a body having a front end and a back end;
   a collapsible cavity for receiving the planar portable electronic device, the collapsible cavity comprising a fixed wall and a sliding wall; and
   a bottom between the fixed wall and the sliding wall that engages an edge of the planar portable electronic device when the planar portable electronic device is received in the collapsible cavity;
   wherein the fixed wall is formed by the back end of the body;
   wherein the sliding wall is slideably attached proximate the back end of the body and slides from a first position where the sliding wall engages the fixed wall to a second position where the first wall is away from the fixed wall.

4. The tray table of claim 3 further comprising a biasing device attached to the sliding wall.

* * * * *